United States Patent
Fiegel, Jr. et al.

[15] 3,650,457
[45] Mar. 21, 1972

[54] PANEL FITTING AND WELDING MACHINE

[72] Inventors: Harry J. Fiegel, Jr.; Russell S. Thatcher; Richard L. Linam, all of Galveston, Tex.

[73] Assignee: Kelso Marine, Inc.

[22] Filed: Jan. 28, 1969

[21] Appl. No.: 794,615

[52] U.S. Cl..................................228/44, 29/429, 29/457, 228/4, 228/5, 228/45
[51] Int. Cl..........................................................B23k 19/00
[58] Field of Search.................228/4, 5, 44, 45; 29/428, 429, 29/457, 462, 493

[56] References Cited

UNITED STATES PATENTS

| | | | |
|---|---|---|---|
| 2,533,605 | 12/1950 | Mueller | 228/4 |
| 2,669,015 | 2/1954 | Schanz | 29/462 X |
| 3,137,936 | 6/1964 | Tomkins | 228/4 X |
| 3,159,129 | 12/1964 | Lindmark | 228/44 |
| 3,164,713 | 1/1965 | Banks et al. | 219/124 |
| 3,171,375 | 3/1965 | Linnander | 228/4 X |
| 3,260,438 | 7/1966 | Bergantini | 228/44 X |

*Primary Examiner*—John F. Campbell
*Assistant Examiner*—R. J. Craig
*Attorney*—Jack W. Hayden

[57] ABSTRACT

A machine for manufacturing reinforced structural panels wherein a conveyor system moves successive loads, each comprising a group of structural shapes and a structural plate, past cooperating positioning and hold-down apparatus, welding apparatus and secondary hold-down apparatus. The positioning and hold-down apparatus maintains the shapes in a desired upright position with a desired spacing between shapes and holds the shapes tightly against the plate. The welding apparatus includes a series of side-by-side welding units for simultaneously welding each group of shapes to its plate. The secondary hold-down apparatus prevents warping of the shapes and plates and keeps the weldment from raising off of the conveyor because of heat distortion during the welding operations.

16 Claims, 21 Drawing Figures

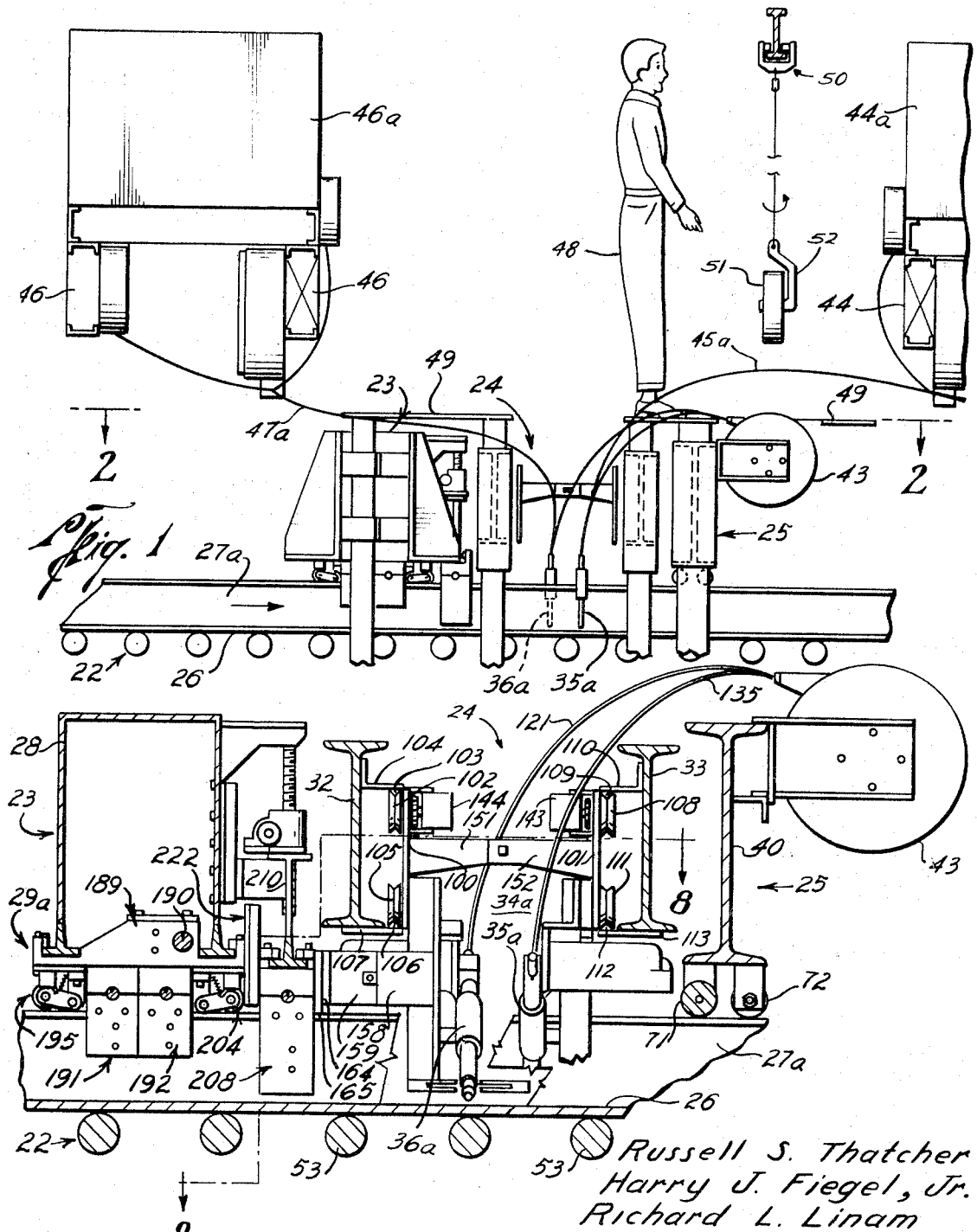

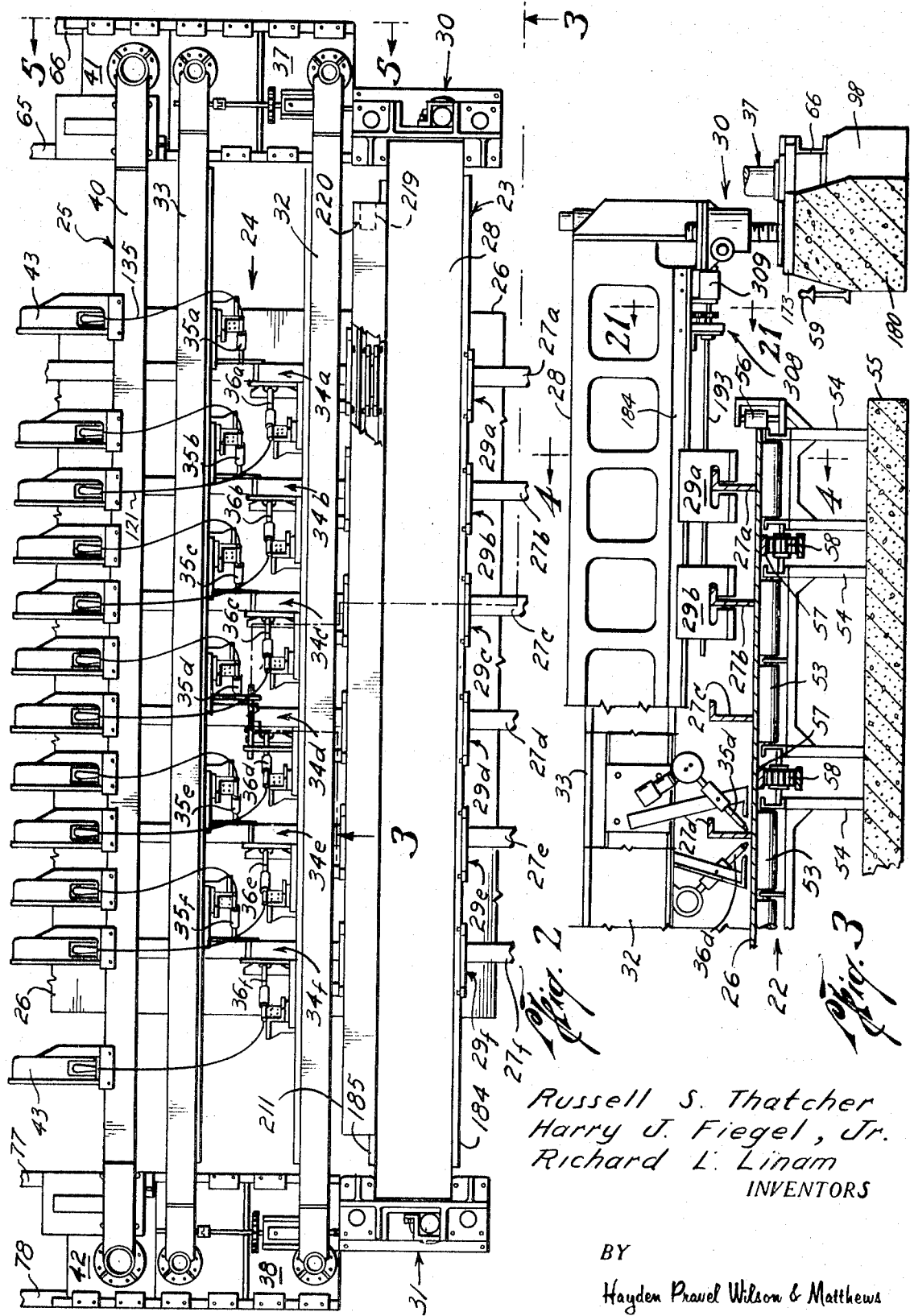

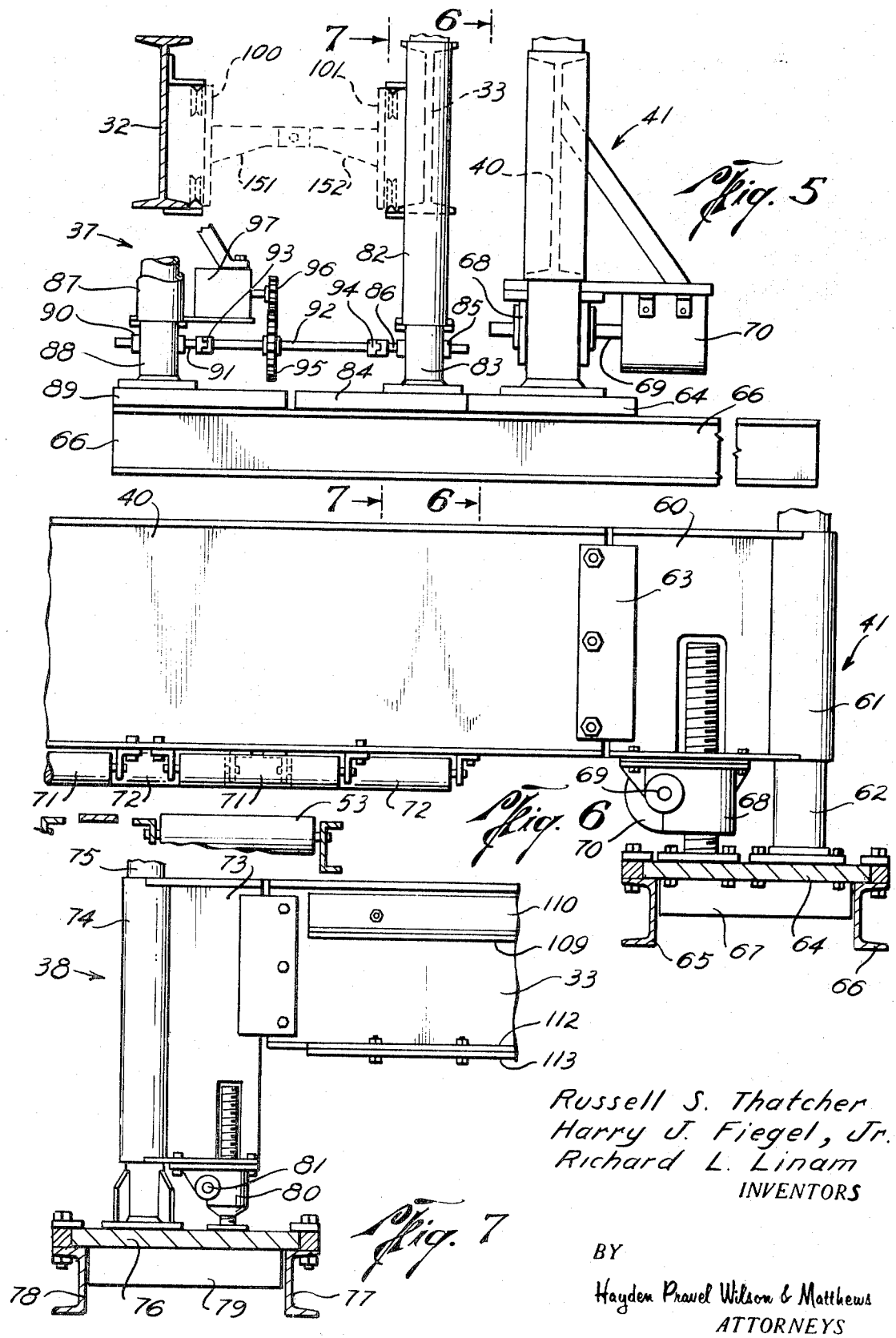

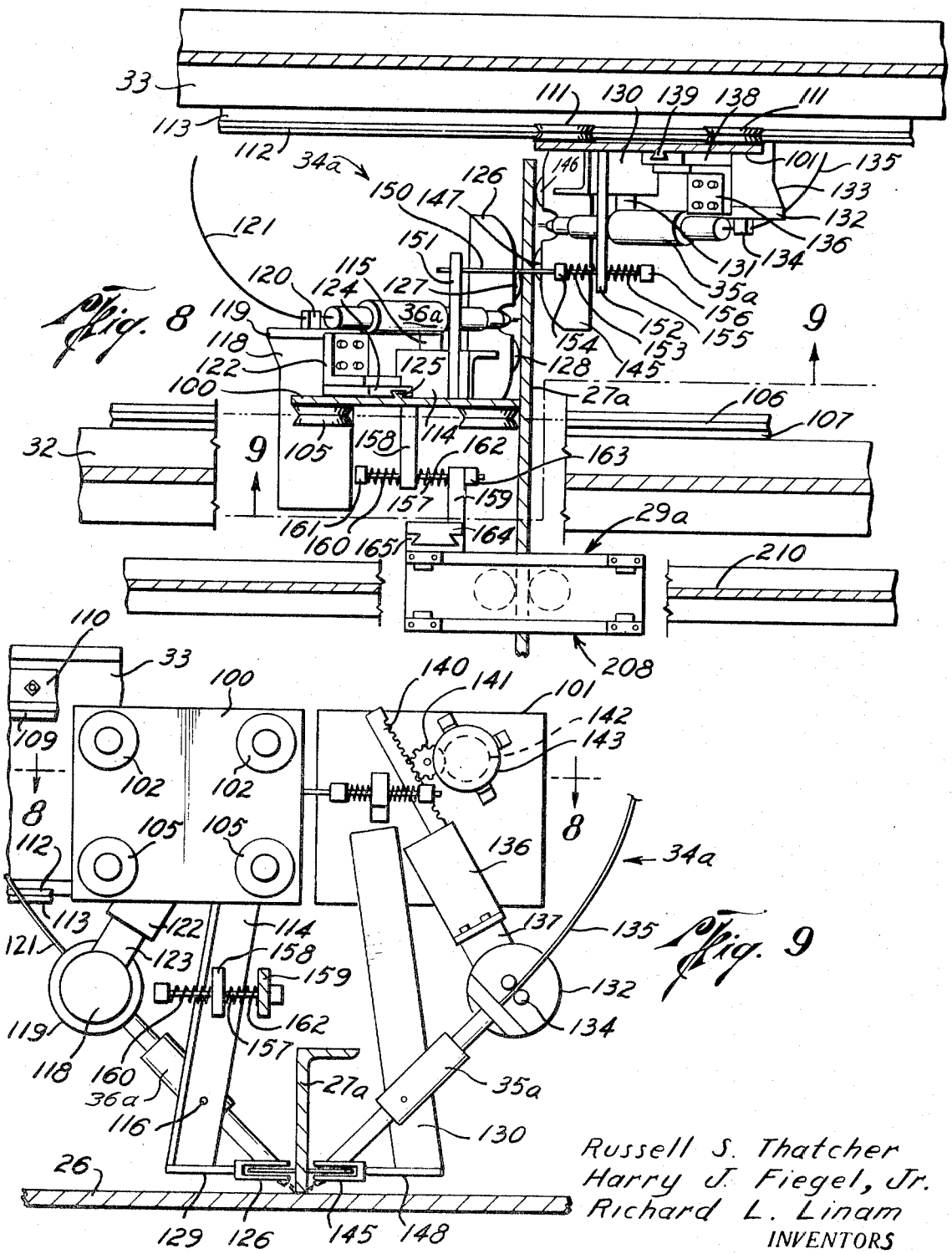

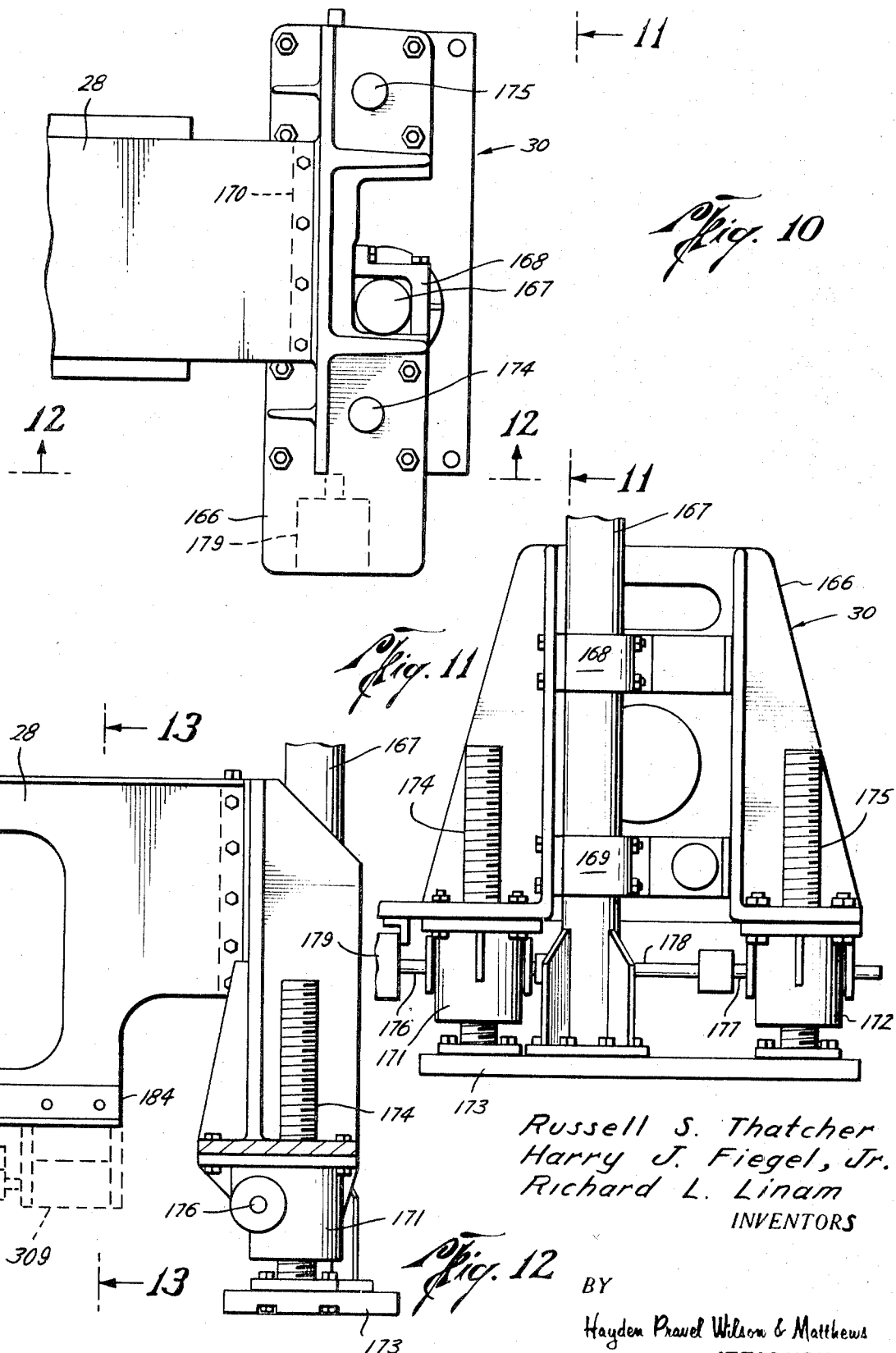

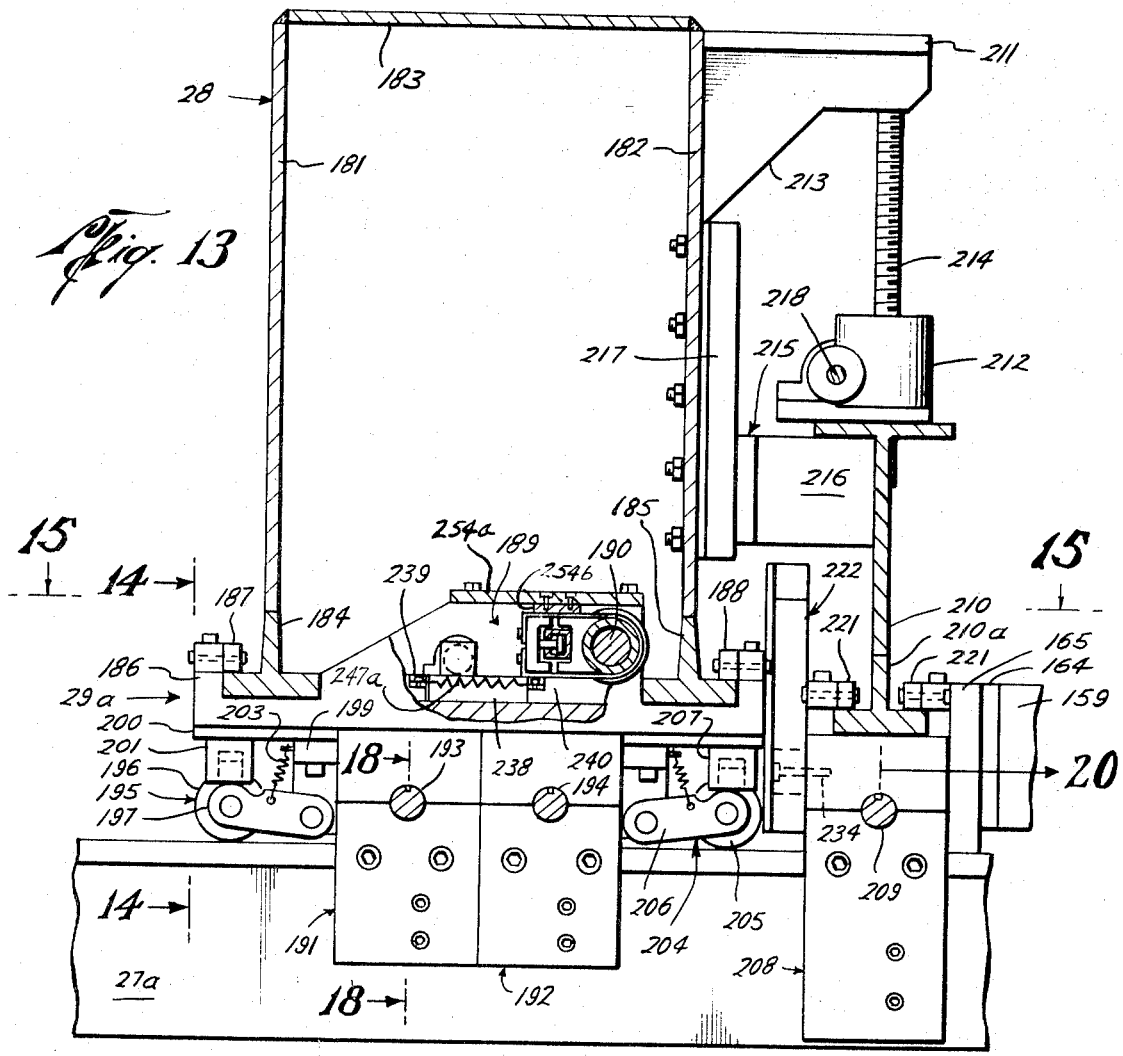
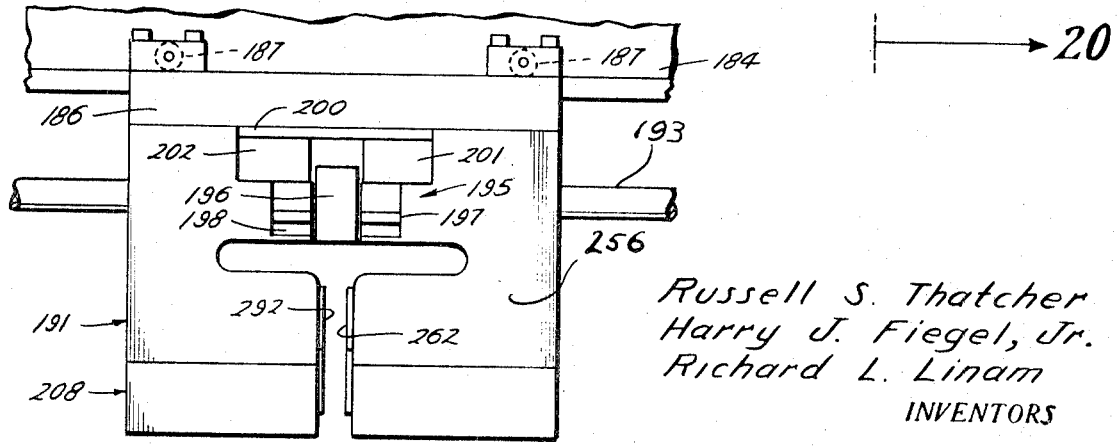
Russell S. Thatcher
Harry J. Fiegel, Jr.
Richard L. Linam
INVENTORS
BY
Hayden Pravel Wilson & Matthews
ATTORNEYS

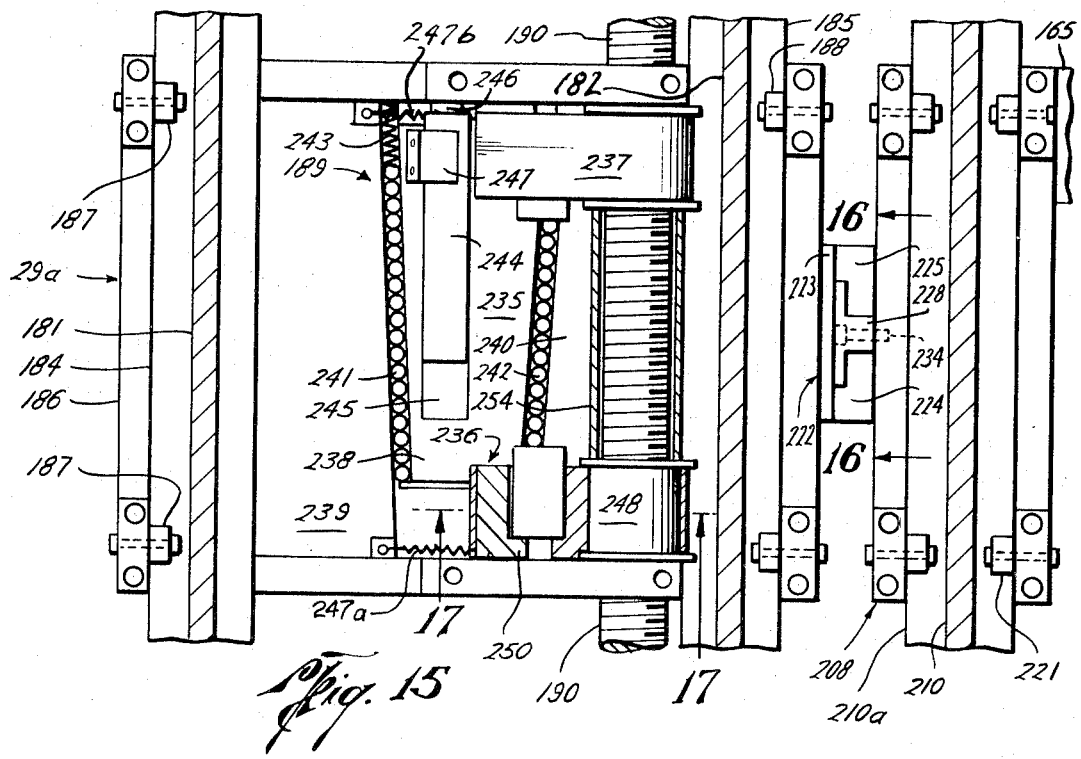
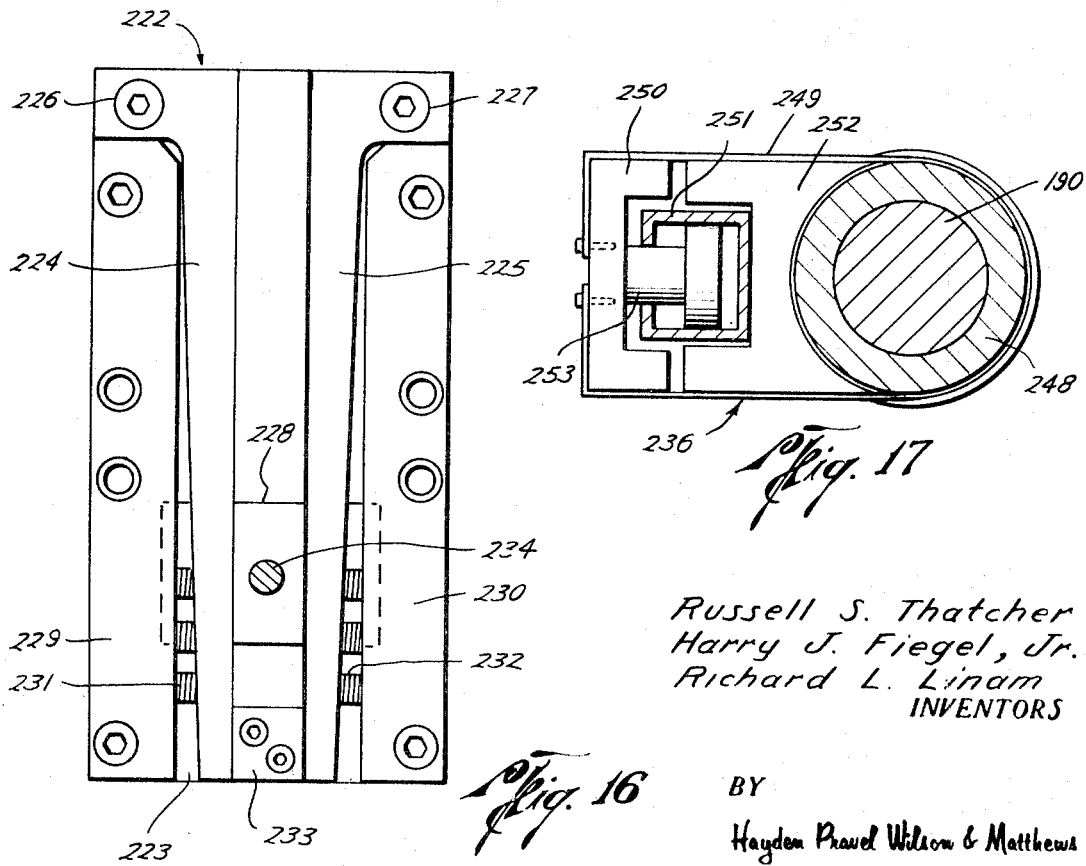

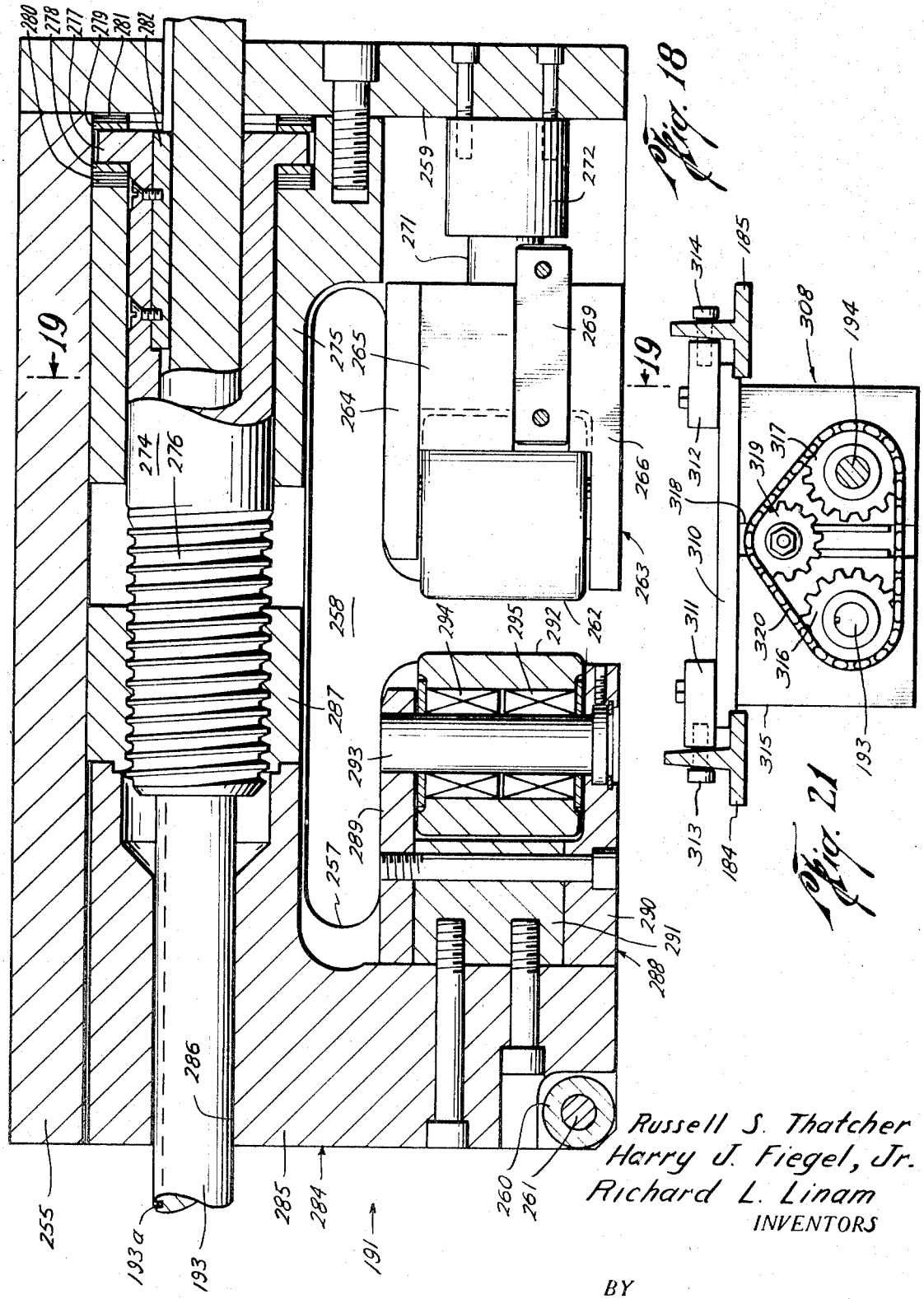

PANEL FITTING AND WELDING MACHINE

BACKGROUND OF THE INVENTION

This invention relates to the manufacture of reinforced structural panels.

Various types of building structures, industrial structures, ships, boats, and marine vessels, or major portions of such items, can be manufactured by combining series or groups of reinforced structural panels. Such panels would take the form of structural steel plates having a series of structural steel shapes, such as I-beams, T-beams, angles, channels and flat bars, attached thereto for reinforcing purposes. While such panels could be formed or fabricated by attaching the structural shapes one at a time in a manual manner, such an approach would be relatively slow and relatively expensive in terms of labor requirements.

Structural panels of these types can be used in the manufacture of various items which are manufactured in relatively large quantities. An example would be the manufacture of marine barges or marine cargo vessels wherein it might be desired to manufacture a hundred or more of the barges or vessels during a single production run. In such a case, the various hull sections, bulkhead sections, etc., can be quickly formed by welding together various groups of these reinforced structural panels. In such cases, however, not only would it be necessary to manufacture a relatively large quantity of structural panels, but it would also usually be necessary to manufacture various different sizes of panels using different types of structural shapes with different spacings between the shapes.

SUMMARY OF THE INVENTION

It is an object of the invention, therefore, to provide a new and improved machine for use in manufacturing reinforced structural panels.

It is another object of the invention to provide a new and improved machine for rapidly fitting and welding structural shapes to structural plates.

It is a further object of the invention to provide a new and improved panel fitting and welding machine which can be quickly adjusted to handle different sizes of structural shapes and plates and to provide different spacings between shapes.

In accordance with the invention, a panel fitting and welding machine comprises welding apparatus including a plurality of welding units for simultaneously welding a plurality of structural shapes to a structural plate. The machine also includes positioning and holddown apparatus including shape positioning means for maintaining the shapes in a selected configuration relative to the plate during the welding operation and holddown means for holding the shapes tightly against the plate during the welding operation.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 1 is a side elevational view of a panel fitting and welding machine constructed in accordance with the present invention;

FIG. 2 is a plan view of the machine of FIG. 1 taken along section line 2—2 of FIG. 1;

FIG. 3 is a partially cut away front elevational view of the right-hand portion of the machine of FIG. 2, such view being taken along section line 3—3 of FIG. 2;

FIG. 4 is a cross-sectional view taken along section line 4—4 of FIG. 3;

FIG. 5 is a more detailed side elevational view taken along section line 5—5 of FIG. 2 and showing in greater detail the support beam structures associated with the welding apparatus and the secondary holddown apparatus;

FIG. 6 is a front elevational view taken along section line 6—6 of FIG. 5 and showing a right-hand portion of the secondary holddown apparatus support beam structure;

FIG. 7 is a front elevational view taken along section line 7—7 of FIG. 5 and showing a left-hand portion of one of the support beam structures associated with the welding apparatus;

FIG. 8 is a plan view type of cross-sectional view taken along section line 8—8 of FIG. 4 and showing in greater detail the construction of one of the welding units;

FIG. 9 is a front elevational view taken along section line 9—9 of the welding unit of FIG. 8;

FIG. 10 is an enlarged plan view of the right-hand end of the support beam structure associated with the positioning and holddown apparatus;

FIG. 11 is a side elevational view of the FIG. 10 support beam structure taken along section line 11—11 of FIG. 10;

FIG. 12 is a front elevational view of the FIG. 10 support beam structure taken along section line 12—12 of FIG. 10;

FIG. 13 is an enlarged view of the positioning and holddown apparatus as shown in FIG. 4 and corresponds to a cross-sectional view taken along section line 13—13 of FIG. 12;

FIG. 14 is a front elevational view taken along section line 14—14 of FIG. 13 and showing one of the shape positioning units;

FIG. 15 is a plan type cross-sectional view of one of the shape positioning units taken along section line 15—15 of FIG. 13;

FIG. 16 is a back elevational view taken along section line 16—16 of FIG. 15 and showing in greater detail a flexible coupling mechanism;

FIG. 17 is an enlarged cross-sectional view taken along section line 17—17 of FIG. 15 and showing in greater detail one of the clutch mechanisms used with each of the shape positioning units;

FIG. 18 is a cross-sectional view taken along section line 18—18 of FIG. 13 and showing in greater detail the internal construction of one of the short guide roller subassemblies used with each of the shape positioning units;

FIG. 21 is a side elevational view taken along section line 21—21 of FIG. 3 and showing in greater detail part of a roller gap adjustment mechanism for the short guide roller subassemblies.

DESCRIPTION OF THE PREFERRED EMBODIMENT

Figure 19:
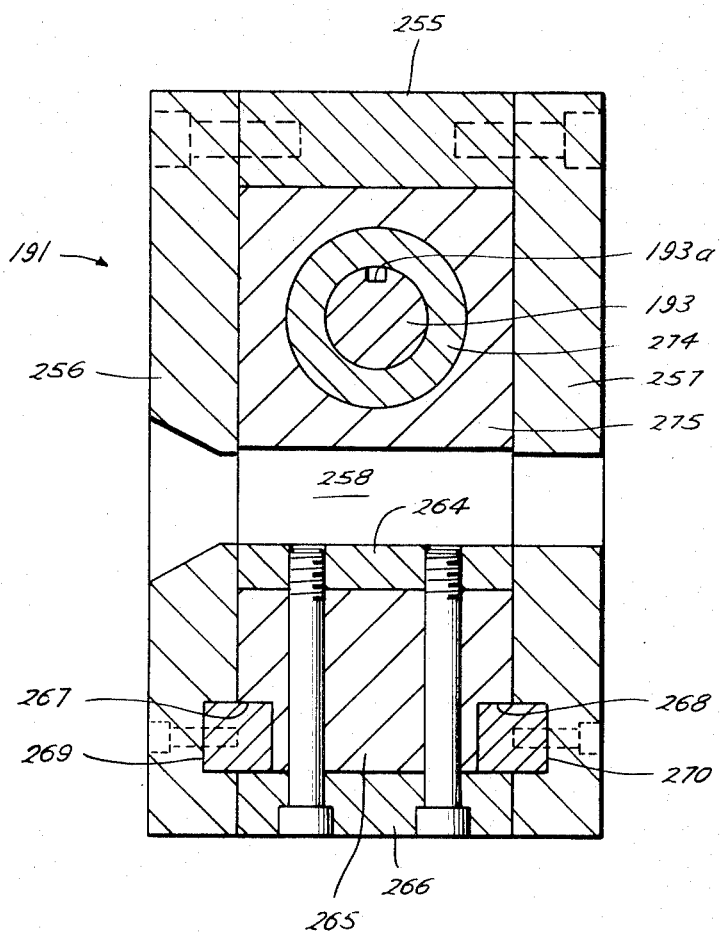
FIG. 19 is a cross-sectional view taken along section line 19—19 of the short guide roller subassembly of FIG. 18.

The machine to be described herein operates to manufacture reinforced structural panels by welding structural steel shapes onto structural steel plates. These structural shapes can take various forms. Examples of structural shapes which may be used are: I-beams, T-beams, angles, channels and flat bars. For sake of an example, an angle or L-beam is illustrated in the drawings. The structural plates, on the other hand, are usually of rectangular shape and can be of various sizes and thicknesses.

The machine to be described herein is designed for use in a continuous manufacturing operation. As such, it is capable of fitting and welding successive groups of shapes to successive plates as rapidly as the welding speed will permit.

Referring to FIG. 1 of the drawings, there is shown a side elevational view of a panel fitting and welding machine constructed in accordance with the present invention. For purposes of explanation, this machine can be subdivided into four groups of structures, which structures are interdependent and cooperate with one another in the fitting and welding of the shapes to the plates. These groups are: a conveyor system indicated in a general way at 22; positioning and holddown apparatus indicated generally at 23; welding apparatus indicated generally at 24; and secondary holddown apparatus indicated generally at 25. A structural plate is indicated at 26 and one of the structural shapes is indicated at 27a. The conveyor system 22 operates to move the plate 26 and shape 27a from left to right in a continuous manner in the side view of FIG. 1. Thus the shapes and plate move in a continuous manner past the positioning and holddown apparatus 23, the welding apparatus 24 and the secondary holddown apparatus 25 in that order.

Referring to the plan view of FIG. 2, it is seen that a group of six structural shapes 27a–27f are spaced in a side-by-side or parallel manner across the width of the structural plate 26. This group of shapes 27a–27f and the plate 26 move in unison past the positioning and holddown apparatus 23, the welding apparatus 24 and the secondary holddown apparatus 25.

As best seen in the plan view of FIG. 2, the positioning and holddown apparatus 23 includes a support beam assembly 28 which is located above and extends laterally across the conveyor system 22, such conveyor system lying under the plate 26 and not being shown in FIG. 2. (By "laterally" is meant a direction at right angles to the direction of movement of the conveyor system 22.) The positioning and holddown apparatus 23 also includes a plurality of laterally movable shape positioning units 29a–29f supported by the support beam assembly 28 and extending below such assembly 28 for guiding the shapes 27a–27f in a direction parallel to the direction of movement of the conveyor system 22 and for maintaining a spaced apart relationship between the shapes 27a–27f. As will be seen hereinafter, each of the shape positioning units 29a–29 also includes sets of primary holddown mechanisms for holding the shapes 27a–27f tightly against the plate 26. The positioning and holddown apparatus 23 further includes a pair of elevator assemblies 30 and 31 for adjusting the height of the support beam assembly 28 above the conveyor system 22. The elevator assembly 30 is attached to the right-hand end of the support beam assembly 28 (looking downstream), while the elevator assembly 31 is attached to the left-hand end of the support beam assembly 28.

The welding apparatus 24 includes a support beam assembly which is comprised of a pair of support beams 32 and 33. These support beams 32 and 33 are located downstream of the positioning and holddown apparatus 23 and each of these beams 32 and 33 is located above and extends laterally across the conveyor system 22. The welding apparatus 24 further includes a plurality of laterally movable welding units 34a–34f supported by the support beams 32 and 33 and extending below such support beams 32 and 33 for welding the structural shapes 27a–27f to the structural plate 26. Each of these welding units 34a–34f includes a pair of welding guns. The welding guns for unit 34a are indicated at 35a and 36a; the welding guns for unit 34b are indicated at 35b and 36b; and so forth. As indicated in the front view of FIG. 3 for the case of the welding unit 34d, one gun of each pair, in this case the gun 35d, serves to weld the right side of the shape 27d to the plate 26, while the other gun of the pair, in this case the gun 36d serves to weld the left side of the shape 27d to the plate 26, the directions being taken looking downstream. The welding apparatus 24 further includes a pair of elevator units 37 and 38 (FIG. 2) for adjusting the height of the support beams 32 and 33 above the conveyor system 22. The elevator unit 37 is attached to the right-hand ends of the beams 32 and 33, while the elevator unit 38 is attached to the left-hand ends of such beams (looking downstream).

The secondary holddown apparatus 25 includes a support beam 40 located downstream of the welding apparatus 24. Such support beam 40 is located above and extends laterally across the conveyor system 22. The secondary holddown apparatus 25 further includes a pair of elevator assemblies 41 and 42 attached to the two ends of the support beam 40 for adjusting the height of such support beam 40 relative to the conveyor system 22. Mounted on the back edge of the upper flange of the support beam 40 are a series of spools or drums 43, each of which contains a supply of welding rod wire. Each of these supply drums 43 supplies welding rod wire to a different one of the welding guns 35a, 36a, 35b, 36b, etc.

Returning for a moment to FIG. 1 of the drawings, the electrical connections to the welding guns will be briefly discussed. In particular, each of the welding guns 35a, 36a, etc., is of the arc-welding type. The electrical power for operating the "right-hand" welding guns 35a, 35b, 35c, and so forth, are supplied by a bank of electrical power sources 44a, 44b, 44c, etc., only the first of which is visible in FIG. 1. These power sources are supported by a system of support beams 44. Electrical energy from the power source unit 44a is supplied to the welding gun 35a by way of an insulated electrical cable 45a. The remainder of the power source units located behind the unit 44a are coupled to their respective welding guns in a similar manner. Electrical power for the "left-hand" welding guns 36a, 36b, 36c, etc., is supplied by a second bank of electrical power source units 46a, 46b, 46c, etc., only the first of which is visible in FIG. 1. These power source units are supported by a system of support beams 46. The power source unit 46a is electrically connected to the welding gun 36a by way of an insulated electrical cable 47a. The remainder of the power source units located behind the unit 46a is connected to their respective welding guns in a similar manner.

A human operator 48 stationed on a catwalk 49 sets up, monitors and maintains the welding operations. Among other things, such operator 48 has the responsibility of replacing the welding rod supply drums 43 when they become empty. This he does with the aid of an overhead monorail hoisting system indicated at 50. A replacement drum 51 is shown on a hoisting hook 52 associated with the hoist system 50.

Referring now to the front elevational view of FIG. 3, the construction of the conveyor system 22 will be discussed in greater detail. As there indicated, the conveyor system 22 includes a series of conveyor rollers 53 upon which ride the structural plate 26. These conveyor rollers 53 are rotatably mounted upon support structures 54 which, in turn, rest on a support base 55, which may take the form of a concrete flooring or foundation. Vertically extending side rollers, a right-hand one of which is indicated at 56, are used for keeping the structural plate 26 on the conveyor system 22. Several laterally spaced pusher chains 57 are used for advancing the plate 26 and the shapes resting thereon along the conveyor system 22. Each of the chains 57 extends the length of the conveyor system 22 and is supported by suitable sprocket members 58. Each of the chains 57 includes a number of retractable dogs an appropriate one of which is used to engage the upstream end of the incoming plate and push it through the panel fitting and welding machine. A suitable driving motor (not shown) is coupled to one of the sprocket members 58 for each of the chains 57.

As indicated in FIG. 1, the conveyor system 22 extends a sufficient distance in the upstream direction to enable the structural plate and its associated shapes to be loaded onto the conveyor system 22 ahead of the positioning and holddown apparatus 23. In this regard, the panel fitting and welding machine of the present patent application may be used in conjunction with a loading machine of the type described in copending patent application Ser. No. 794,687, for "Loading Machine For Structural Members," filed in the names of Messrs. Harry J. Fiegel, Jr. and Russell S. Thatcher on the same date as this patent application. One of the carriage tracks associated with such loading machine is indicated at 59 in FIG. 3. Briefly stated, such loading machine places the structural shapes on the plate which has been placed on the conveyor system 22 with the proper spacing and with the proper upright orientations.

Referring now to FIG. 4 of the drawings, there is shown a cross-sectional view taken along the section line 4—4 of FIG. 3. This view shows in greater detail the construction of the first shape positioning unit 29a and the first welding unit 34a as seen from the right side of the machine. For sake of simplicity, the details of conveyor system 22 have been omitted. FIG. 4 will be referred to from time to time during the discussion of the more detailed views of the different parts of the machine.

Referring now to FIG. 5 of the drawings, there is shown a side elevational view of the right-hand elevator units 37 and 41 associated with the welding apparatus beams 32 and 33 and the secondary holddown apparatus beam 40. This view corresponds to a view taken along section line 5—5 of FIG. 2. Considering first the elevator assembly 41 for the holddown support beam 40, a front elevational view of this assembly, as well as the right-hand side of the support beam 40, is shown in FIG. 6, this being a view taken along section line 6—6 of FIG. 5. As seen in FIG. 6, the holddown support beam 40 is attached to a sliding member 60 having a sleeve portion 61 which rides on a vertical guide column 62. Beam 40 is attached to the sliding member 60 by means of a pair of coupling plates, the one on the front side of the beam 40 being indicated at 63. This coupling plate 63 and a corresponding one on the back side of the beam 40 are welded to the sliding member 60 and bolted to the beam 40. The guide column 62 rests on a base plate 64 which rides on a track formed by a pair of channel beams 65 and 66. A guide tongue 67 keeps the base plate 64 properly positioned on the beams 65 and 66. The sliding member 60 and, hence, the beam 40 is raised and lowered by means of a jack mechanism 68 which is positioned intermediate the underside of the sliding member 60 and the base plate 64. The body portion of the jack mechanism 68 is bolted to the underside of the sliding member 60. As best seen in FIG. 5, the drive shaft 69 of the jack mechanism 68 is coupled to a motor 70 which, when activated, serves to rotate the shaft 69 and thus to cause the jack mechanism 68 to raise or lower the sliding member 60, depending upon the direction of rotation of the drive shaft 69. The motor 70 may be of either the hydraulic or electric type.

The elevator unit 42 located at the opposite or left-hand end of the holddown support beam 40 is of an identical form of construction. It includes a motor corresponding to the motor 70 for raising and lowering the left-hand side of the beam 40. These motors are driven from a common power source so that the two ends of the beam 40 move up and down in unison keeping the beam 40 parallel to the conveyor system 22. As an alternative, a single motor may be used, such motor being coupled to the drive shafts of the right-hand and left-hand jack mechanisms by means of suitable gearing and coupling shafts.

Attached to the underside of the holddown beam 40 are two staggered sets of holddown rollers 71 and 72. These rollers 71 and 72 are rotatably mounted by means of suitable support brackets which are bolted to the underside of the beam 40. As best seen in the cross-sectional view of FIG. 4, the rollers 72 are mounted a short distance behind the rollers 71. As indicated in FIG. 6, the rollers 72 are laterally shifted relative to the rollers 71 so that the rollers 72 cover the intervals occupied by the support brackets for the rollers 71. In FIG. 6, the support beam 40 is shown in a lowered position relative to the rollers 53 of the conveyor system 22.

Referring now to FIG. 7, there is shown a front elevational view of a portion of the elevator unit 38 located at the left-hand end of the back welding apparatus support beam 33. This corresponds to a view taken along the section line 7—7 of FIG. 5. As indicated in FIG. 7, the back welding apparatus support beam 33 is fastened to a sliding member 73 having a sleeve portion 74 which rides on a vertical guide column 75. The guide column 75 rests on a base plate 76 which rides on a track formed by a pair of channel beams 77 and 78. One or more guide tongues 79 are attached to the bottom of the base plate 76 for keeping such base plate centered with respect to the channel beams 77 and 78. A jack mechanism 80 is mounted between the underside of the sliding member 73 and the base plate 76 for purposes of raising and lowering the sliding member 73 and hence the left-hand side of the beam 33. The body portion of such jack mechanism 80 is bolted to the underside of the sliding member 73. A drive shaft 81 of the jack mechanism 80 is coupled to a suitable motor for driving same.

The portion of the right side elevator unit 37 which is attached to the right-hand end of the support beam 33 is of an identical construction and is shown in part in FIG. 5. As indicated in FIG. 5, such right side portion includes a sliding member sleeve portion 82 which rides on a vertical guide column 83, such guide column resting on a base plate 84. A jack mechanism 85, only part of which is visible in FIG. 5, serves to raise and lower the sleeve portion 82 and hence the right-hand end of the support beam 33. Such jack mechanism 85 includes a drive shaft 86.

The portions of the right-side elevator unit 37 and the left-side elevator unit 38 which are attached to the front welding apparatus support beam 32 are identical in construction to those portions which are attached to the back support beam 33. Part of the elevator unit 37 which is connected to the front beam 32 is shown in FIG. 5. As there indicated, such portion includes a sliding member sleeve portion 87 which rides on a vertical guide column 88 which, in turn, rests on a base plate 89. A jack mechanism 90, only part of which is visible in FIG. 5, serves to raise and lower the sleeve member 87 and hence the right-hand end of the support beam 32. A drive shaft 91 for the jack mechanism 90 is coupled to a further drive shaft 92 by a coupling member 93. The opposite end of the shaft 92 is coupled by way of a further coupling member 94 to the drive shaft 86 of the back beam jack mechanism 85. A drive gear 95 is mounted on the shaft 92 and, in turn, engages a drive gear 96 mounted on the shaft of a motor 97. The motor 97 is attached to the sliding member associated with the sleeve portion 87 by means of suitable mounting brackets and plates.

Motor 97 serves, when activated, to drive the jack mechanisms 85 and 90 and thus to raise or lower the right-hand ends of the welding apparatus support beams 32 and 33. A similar motor drive arrangement is used for the elevator unit 38 located at the other or left-hand ends of the support beams 32 and 33. The two motors at the two ends of the beams 32 and 33 are driven by a common power source so that the beams 32 and 33 are raised and lowered in unison in a manner which keeps the beams 32 and 33 parallel to the conveyor system 22. As an alternative form of construction, a single driving motor may be used for both the right-side elevator unit 37 and the left-side elevator unit 38. Such single motor would be connected to the various jack mechanisms by way of an appropriate system of coupling gears and coupling shafts.

As indicated in FIG. 3, the channel beam 66 forming the right rail of the track for the right-side elevator units 37 and 41 rests on a concrete footing 98. The channel beam 65 forming the left rail of this same track rests on this same footing 98 but is hidden from view in FIG. 3. The channel beams 77 and 78 for the left-side elevator track are similarly mounted on a second concrete footing (not shown) located on the left side of the machine.

Referring now to FIGS. 8 and 9, there are shown more detailed plan and front elevational views of the welding unit 34a, this being the welding unit nearest the right-hand side of the machine when looking downstream. This first welding unit 34a includes a pair of laterally movable support carriages 100 and 101. As best seen in the side view of FIG. 4, the support carriage 100 has rotatably mounted thereon an upper set of carriage wheels 102 which rides on a V-shaped track 103. Track 103 is suspended from the front welding apparatus support beam 32 by means of a support bracket 104. The support carriage 100 further includes a rotatably mounted set of lower carriage wheels 105 which ride on a lower V-shaped track 106. Such track 106 is supported from the support beam 32 by means of a bracket plate 107 which is attached to the underside of the beam 32.

The second support carriage 101 is mounted in a similar manner to the rear welding apparatus support beam 33. In particular, the support carriage 101 includes an upper set of carriage wheels 108 which is rotatably mounted thereon and which rides on an upper V-shaped track 109. Track 109 is suspended from the rear support beam 33 by a support bracket 110. The support carriage 101 further includes a lower set of rotatably mounted carriage wheels 111 which rides on a lower V-shaped track 112 which is supported from the support beam 33 by a bracket plate 113.

The V-shaped tracks 103, 106, 109 and 112 extend the entire lengths of the support beams 32 and 33, except for small intervals near the ends of the beams.

Returning to FIGS. 8 and 9, it is initially noted that in FIG. 8 the upper flange of the structural shape 27a has been omitted from the drawing in order to render visible the details of the welding structure lying therebelow. Considering first the left-side welding gun 36a and its support carriage 100, such support carriage 100 has welded thereto a short length of angle beam 114 which, as indicated in FIG. 9, extends downwardly below the support carriage 100. The welding gun 36a is pivotally connected to this angle beam 114 by means of a coupling member 115 (FIG. 8) having a coupling pin 116 (FIG. 9) which is rotatably mounted in a cylindrical passageway which is cut through the angle beam 114. The upper end of the welding gun 36a is fastened to a welding rod feed motor 118. The feed motor 118 includes a face plate member 119 which is rotatably mounted on the front end of the motor 118. The upper end of the welding gun 36a is attached to this rotatable face plate 119. The motor 118 further includes a set of welding rod feed wheels located at 120 in FIG. 8 for feeding welding rod wire 121 to the welding gun 36a.

The welding rod feed motor 118 is supported from the support carriage 100 by way of a bracket member 122 and a connecting piece 123 (FIG. 9), the latter of which is attached to the main body of the motor 118. The bracket member 122 is fastened to a sliding block member 124 having a dovetail shaped slot cut down the length thereof. Such dovetail slot rides on a dovetail shaped key 125 which is fastened to or formed on the inner side of the support carriage 100. The upper end of the sliding block member 124 has connected thereto a rack member (not shown) which controls the position of the sliding block member 124 along the key 125.

Cooperating with the lower tip of the welding gun 36a is a guide shoe subassembly 126. This subassembly 126 includes a pair of rotatably mounted wheels 127 and 128 for establishing the proper standoff of the tip of the welding gun 36a with respect to the structural shape 27a being welded. As seen in FIG. 9, the guide shoe subassembly 126 is supported from the lower end of the angle beam 114 by means of a support member 129.

The structure associated with the second or right side welding gun 35a and the second support carriage 101 is similar to that described for the first gun 36a and the first support carriage 100. In particular, the second welding gun 35a is pivotally coupled to an angle beam 130 which is attached to and extends below the support carriage 101 as best seen in FIG. 9. This pivotal connection is provided by a coupling member 131 (FIG. 8). The upper end of the welding gun 35a is connected to a rotatable face plate 132 of a second welding rod feed motor 133. Such motor 133 drives a pair of welding rod feed wheels 134 which feeds a welding rod 135 to the welding gun 35a.

The main body of the feed motor 133 is coupled to the support carriage 101 by way of a bracket member 136 and a connecting piece 137 (FIG. 9) which is connected to the body of the motor 133. Bracket member 136 is, in turn, fastened to a sliding block member 138 (FIG. 8) having an elongated dovetail shaped slot cut in the opposite side thereof. This dovetail slot cooperates with an elongated dovetail shaped key 139 which is fastened to or formed on the inner side of the support carriage 101. The upper end of the sliding block member 138 (FIG. 8) has attached thereto a rack member 140 (FIG. 9). As seen in FIG. 9, this rack member 140 is coupled by way of gears 141 and 142 to a stepping motor 143. Such stepping motor 143 is secured to the support carriage 101 by suitable mounting brackets.

When activated, the motor 143 serves to raise or lower the sliding block member 138 and attached bracket member 136 and hence the welding rod feed motor 133. This, in conjunction with the pivoting action provided by the coupling member 131, serves to move the tip of the welding gun 35a either toward or away from the upright or vertical portion of the structural shape 27a. This adjustment is provided to take into account the case where the structural shape includes a flange member which is resting on the structural plate 26 on the same side of the shape as is the welding gun 35a.

A similar type of adjustment mechanism (not shown) is provided for the first or left-side welding gun 36a. In particular, the sliding block member 124 (FIG. 8) associated with such gun has connected to the upper end thereof a rack member corresponding to the rack member 140, which rack member is coupled by way of a pair of gears to a stepping motor 144 which can be seen in FIG. 4.

As seen in FIG. 2, the welding rod wires 121 and 135 are supplied to the welding guns 36a and 35a by respective ones of the supply drums 43 for these guns.

As seen in FIG. 8, a guide shoe subassembly 145 cooperates with the tip end of the second welding gun 35a. This guide shoe subassembly 145 includes a pair of rotatably mounted wheels 146 and 147 which engage the side of the vertical portion of the shape 27a and provide the proper standoff spacing for the tip of the welding gun 35a. As seen in FIG. 9, the guide shoe subassembly 145 is supported from the lower end of the angle beam 130 by means of a support member 148.

The two support carriages 100 and 101 are coupled together by means of a compliant linkage system. This linkage system includes a coupling shaft 150 which runs between a first coupling arm 151 which is rigidly fastened to the first support carriage 100 and a second coupling arm 152 which is rigidly fastened to the second support carriage 101. The shaft 150 is locked in a suitable passageway through the first coupling arm 151. The shaft 150 also passes through an oversized, loose-fitting passageway in the second coupling arm 152. A first coil spring 153 is located on the shaft 150 between the left side of the coupling arm 152 and a locking nut 154 which is securely fastened to the shaft 150. A second coil spring 155 is located on the shaft 150 between the right side of the coupling arm 152 and a second locking nut 156 which is securely fastened to the right-hand end of the shaft 150. This compliant linkage system formed by elements 150–156 enables the second support carriage 101 to follow any lateral movement of the first support carriage 100. The compliant action provided by the coil springs 153 and 155 allows the separation distance between the tips of the two welding guns 35a and 36a to change to accommodate structural shapes having different thicknesses for their vertical portions (normally their web portions).

The first or forward support carriage 100 is coupled to the back end of the first shape positioning unit 29a by means of a second compliant linkage system. This linkage system includes a coupling shaft 157 which extends between a first coupling arm 158 which is rigidly fastened to the front side of the support carriage 100 and a second coupling arm 159 which is fastened to the back end of the shape positioning unit 29a by way of a dovetail mechanism. A coil spring 160 is positioned on the shaft 157 between the left side of the coupling arm 158 and a locking nut 161 which is securely fastened to the left end of the shaft 157. A second coil spring 162 is located on the shaft 157 between the coupling arms 158 and 159. A second locking nut 163 is securely fastened to the right end of the shaft 157. The shaft 157 passes through oversized, loose-fitting passageways in each of the arm members 158 and 159.

The dovetail mechanism to which the coupling arm 159 is secured includes a first block member 164 having a dovetail shaped key and a second block member 165 having a dovetail shaped slot in which rides the key of the block member 164. The first block member 164 is attached to the coupling arm 159, while the second block member 165 is attached to the back end of the shape positioning unit 29a. As indicated in FIG. 4, each of the block members 164 and 165 is of a vertically extending nature, the block member 165 having a greater vertical length and, in fact, extending the vertical length of the back end portion of the shape positioning unit 29a to which it is connected (this being hidden in part by the structural shape 27a in FIG. 4).

This second compliant linkage system formed by elements 157–165 (FIG. 8) enables the welding unit 34a to follow any lateral changes in the position of the shape positioning unit 29a. This linkage system also enables the machine to accommodate curvature errors in the structural shapes being handled.

Each of the other welding units 34b–34f (FIG. 2) is identical in construction to the welding unit 34a just discussed.

Referring now to FIGS. 10–12, there is shown in greater detail the construction of the elevator assembly 30 which supports the right-hand end (looking downstream) of the positioning and holddown apparatus support beam 28. This elevator assembly 30 includes a sliding frame member 166 which is slidably mounted on a vertical guide column 167. This mounting is achieved by means of a pair of bracket members 168 and 169 (FIG. 11) which extends around two sides of the guide column 167 and is bolted to the frame member 166. The support beam 28 is bolted to an extended shoulder portion 170 (FIG. 10) of the frame member 166. As seen in FIG. 11, a pair of jack mechanisms 171 and 172 is located between the bottom of the frame member 166 and a base plate 173. Jack screws 174 and 175 of the jack mechanisms 171 and 172, respectively, extend through cooperating oversized holes in the bottom portion of the frame member 166. The main bodies of the jack mechanisms 171 and 172 are bolted to the bottom portion of the frame member 166. Drive shafts 176 and 177 of the jack mechanisms 171 and 172, respectively, are connected together by means of a coupling shaft 178 and suitable coupling members. The front end of the drive shaft 176 of the jack mechanism 171 is connected to a motor 179 which is supported from the underside of the frame member 166 by suitable support brackets. As shown in FIG. 3, the base plate 173 rests on and is secured to a concrete footing 180.

FIGS. 11 and 12 show the elevator assembly 30 in a lowered position. FIG. 3, on the other hand, shows the elevator assembly 30 in a raised or elevated position. The vertical position of the frame member 166 is changed by activating the motor 179 which drives the drive shafts of the jack mechanisms 171 and 172.

The elevator assembly 31 (FIG. 2) which supports the left-hand end (looking downstream) of the support beam 28 is of an identical form of construction, but of opposite orientation. As such, it includes a motor for driving the two jack mechanisms associated with such assembly 31. This motor and the motor 179 of the right side elevator assembly 30 are energized by a common power source such that both ends of the support beam 28 will move up and down together. As an alternative form of construction, a single drive motor may be used, such motor being coupled to the jack mechanisms of both of the elevator assemblies 30 and 31 by way of an appropriate system of coupling gears and coupling shafts. Each of the four jack mechanisms, namely, the jack mechanisms 171 and 172 and the corresponding pair of jack mechanisms in the left-side elevator assembly 31, is provided with a maximum lifting capacity of 20 tons.

Referring now to FIG. 13, there is shown an enlarged cross-sectional view of the positioning and holddown apparatus support beam 28 and a partially cut away enlarged view of the first shape positioning unit 29a which is supported by such beam 28. This corresponds to a view taken along either section line 4—4 of FIG. 3 or section line 13—13 of FIG. 12. As indicated in FIG. 13, the support beam 28 is of a box beam construction and includes front and back panels 181 and 182 and a top panel 183. Top panel 183 is welded to the front and back panels 181 and 182. A T-shaped track member 184 is welded to the bottom end of the front panel 181, while a second T-shaped track member 185 is welded to the bottom end of the back panel 182. As indicated in FIG. 2, these track members 184 and 185 extend across the entire length of the beam 28 except for short intervals near the ends thereof.

The shape positioning unit 29a includes a laterally movable support carriage 186 which is suspended between the front and back panels 181 and 182 of the support beam 28 by means of sets of rotatably mounted rollers 187 and 188. The front rollers 187 ride on the front track member 184, while the back rollers 188 ride on the rear track member 185. Located on the upperside of the support carriage 186 is a carriage drive mechanism 189. This drive mechanism 189 cooperates with a lead screw 190 which runs the length of the support beam 28. A motor (not shown) is mounted inside the support beam 28 near one end thereof for driving the lead screw 190. The carriage drive mechanism 189, when in an engaged condition, serves to move the support carriage 186 along the track members 184 and 185.

Attached to the underside of the support carriage 186 is a pair of short guide roller subassemblies 191 and 192. A keyed control shaft 193 extends through the guide roller subassembly 191 for purposes of adjusting the gap between the guide rollers located therein. In a similar manner, a second keyed control shaft 194 extends through the second guide roller subassembly 192 for purposes of adjusting the gap between the rollers therein. These keyed control shafts 193 and 194 extend from side to side through the machine for practically the entire length of the support beam 28.

Attached to the under side of the support carriage 186 ahead of the guide roller subassembly 191 is a first holddown roller subassembly 195. A front elevational view of this subassembly 195 is shown in FIG. 14. As seen from FIGS. 13 and 14, this subassembly 195 includes a holddown roller 196 which is rotatably mounted between a pair of support arms 197 and 198. The rearward ends of these support arms 197 and 198 are pivotally connected to a T-shaped support block 199 (FIG. 13), the portion forming the top of the T being bolted to a support plate 200. Support plate 200 is fastened to the under side of the support carriage 186. A pair of hydraulic ram mechanisms 201 and 202 is secured to the support plate 200 above the forward ends of the support arms 197 and 198. Each of these ram mechanisms 201 and 202 includes a piston member which is driven against the upper surface of the corresponding one of the support arms 197 and 198 when the ram mechanisms 201 and 202 are energized. This urges the holddown roller 196 against the top surface of the structural shape 27a with a very considerable force. The amount of holddown force may be varied to suit the particular type and size of structural shape being handled by controlling the pressure of the hydraulic fluid supplied to the ram mechanisms 201 and 202. The maximum holddown force for each of the ram mechanisms 201 and 202 may be, for example, on the order of 8,000 pounds. A pair of coil springs, the left-hand one of which is indicated at 203 in FIG. 13, is coupled between the support arms 197 and 198 and the support block 199 for holding the holddown roller 196 in a retracted position when the ram mechanisms 201 and 202 are not energized.

Attached to the underside of the support carriage 186 to the rear of the second short guide roller subassembly 192 is a second holddown roller subassembly 204. This second holddown roller subassembly 204 is of identical construction to the first holddown roller subassembly 195. As such, this second subassembly 204 includes a holddown roller 205 rotatably mounted between a pair of support arms, the outer one of which is indicated at 206. A pair of hydraulic ram mechanisms, the outer one of which is indicated at 207, serves to urge the holddown roller 205 in a downwardly direction against the top of the structural shape 27a during the manufacturing operation.

Slidably coupled to the rear end of the support carriage 186 is a long guide roller subassembly 208. A keyed control shaft 209 extends through this subassembly 208 for purposes of adjusting the gap between the rollers contained therein. This long guide roller subassembly 208 is coupled to the support beam 28 in such a manner that the subassembly 208 may be retracted in an upwardly direction so as to be removed from the manufacturing operation when structural shapes of relatively small vertical height are being handled.

To this end, the long guide roller subassembly 208 is mounted on a T-shaped secondary support beam 210 which is suspended from an overhead support plate 211 by means of a jack mechanism 212. A T-shaped track member 210a is welded to the lower end of the beam 210. The secondary support beam 210, the track member 210a and the support plate 211 extend in a lateral direction for practically the entire length of the primary support beam 28. The support plate 211 is welded to the upper end of the rear panel 182 of the support beam 28. A series of support brackets 213 is spaced along the primary support beam 28 and is attached to both the rear panel 182 and the support plate 211 for providing additional support for the latter. The main body of the jack mechanism 212 is attached to the top flange of the secondary support beam 210. A jack screw 214 of jack mechanism 212 is coupled at its upper end to the support plate 211. The secondary support beam 210 is further coupled to the rear panel 182 of the primary support beam 28 by means of a dovetail mechanism 215. A first portion 216 of this dovetail mechanism 215 is attached to the secondary support beam 210. A second portion 217 is bolted to the rear panel 182. The first portion 216 includes a vertically extending dovetail shaped key which rides in a vertically extending dovetail shaped slot in the second portion 217. Rotation of a drive shaft 218 of the jack mechanism 212 operates to raise or lower the secondary support beam 210.

It is not necessary to provide the same number of jack mechanisms 212 and dovetail mechanisms 215 as there are numbers of shape positioning units (29a–29f). In fact, it is sufficient to provide only two of these jack mechanisms 212, one being located near one end and the other being located near the other end of the secondary support beam 210. Likewise, it is sufficient to provide only three of the dovetail mechanisms 215, two being located near the two ends and the third being located near the middle of the secondary support beam 210.

The drive shafts 218 for the jack mechanisms 212 are connected in series with one another and with a motor 219 (FIG. 2), such motor being mounted on the secondary support beam 210 at one end thereof. A stepping motor 220 (FIG. 2) for driving the keyed control shaft 209 of the long guide roller subassembly 208 is also mounted on the secondary support beam 210 at the same end thereof.

As seen in FIg. 13, the long guide roller subassembly 208 is hung from the track member 210a of the secondary support beam 210 by means of rollers 221. The guide roller subassembly 208 is also slidably connected to the rear end of the support carriage 186 by means of a vertical slide coupling subassembly 222. This coupling subassembly 222 locks the long guide roller subassembly 208 to the support carriage 186 so that the lateral position of the long guide roller subassembly 208 on the track member 210a is in line with the lateral position of the support carriage 186 on the track members 184 and 185. On the other hand, the vertical slide coupling subassembly 222 permits vertical movement of the long guide roller subassembly 208 relative to the support carriage 186. In a similar manner, the dovetail mechanism attached to the rear of the guide roller subassembly 208 and represented by members 164 and 165 enables vertical movement of the long guide roller subassembly 208 with respect to the welding unit 34a which is coupled to this long guide roller subassembly 208 (See FIG. 8). It is for this reason that the dovetail member 165 extends vertically for the vertical length of the guide roller subassembly 208.

Referring now to FIG. 15 of the drawings, there is shown a plan type cross-sectional view of the shape positioning unit 29a of FIG. 13. As such, FIG. 15 represents a view taken along section line 15—15 of FIG. 13. As indicated in FIg. 15, the vertical slide coupling subassembly 222 is located between the back end of the support carriage 186 and the front side of the long guide roller subassembly 208. An elevational view (looking from the rear) of this flexible coupling subassembly 222 is shown in FIG. 16.

Considering therefore both FIGS. 15 and 16, this coupling subassembly 222 includes a base plate 223 which is secured to the back end of the support carriage 186. A pair of spring-biased guide arms 224 and 225 is pivotally connected to the base plate 223 by means of shoulder screws 226 and 227 located at the upper ends thereof (FIG. 16). A T-shaped sliding block 228 is mounted between the guide arms 224 and 225 with the head or cross piece of the T being located under and extending laterally past the guide arms 224 and 225, as indicated in FIG. 16. The cross piece of the sliding block 228 also extends under the inner edges of a pair of fixed guide members 229 and 230 which are bolted to the base plate 223. A first series of coil springs 231 is mounted between the fixed guide member 229 and the pivoted guide arm 224 for purposes of urging the guide arm 224 inwardly against the outwardly extending trunk or stem of the sliding block 228. A second set of coil springs 232 is located between the right-hand guide member 230 and the second pivoted guide arm 225, these springs 232 serving to urge the arm 225 inwardly against the other side of the trunk of the sliding block 228. A bottom stop member 233 is bolted to the base plate 223 for limiting the downward movement of the sliding block 228 and also for limiting the inward movement of the guide arms 224 and 225. The sliding block 228 is connected to the long guide roller subassembly 208 by means of a bolt 234.

The coupling action provided by the slide coupling subassembly 222 causes the long guide roller subassembly 208 to follow any lateral movement or change in position of the support carriage 186 while, at the same time, permitting vertical movement of the long guide roller subassembly 208 relative to the support carriage 186. The flexible nature of the coil springs 231 and 232 of the coupling assembly 222 provides a desirable degree of lateral flexibility in the coupling action. Thus, if a structural shape should be slightly off center when it reaches the long guide roller subassembly 208, this flexibility will enable the guide roller subassembly 208 to shift sufficiently in a lateral direction to accommodate this centering error.

Returning now to FIG. 15 of the drawings, the carriage drive mechanism 189 there shown includes three major subassemblies or mechanisms. It includes a locking mechanism 235 for locking the support carriage 186 to the track members 184 and 185 when so desired. It also includes a pair of clutch mechanisms 236 and 237 for selectively coupling the support carriage 186 to the lead screw 190 for causing lateral movement of the carriage 186.

The locking mechanism 235 includes a wedge member 238 and a pair of movable clamping shoes 239 and 240 which, as indicated in FIg. 13, rest on the top surface of the support carriage 186. A first series of roller bearings 241 is located between the clamping shoe 239 and the wedge member 238, while a second series of roller bearings 242 is located between the wedge member 238 and the rear clamping shoe 240. Suitable coil springs, such as the spring 243, keep these roller bearings grouped together during movement of the wedge member 238. Mounted on the wedge member 238 is a hydraulic ram mechanism 244. One end of this ram mechanism rests against a retaining block 245 which is attached to the wedge member 238, while a piston element 246 of the ram mechanism 244 rests against the raised side portion of the support carriage 186. The ram mechanism 244 is held in place by means of a retaining clamp 247.

When the hydraulic ram mechanism 244 is energized, the piston 246 thereof is caused to push against the side of the support carriage 186, which, in turn, moves the wedge member 238 toward the opposite side of the support carriage 186. This movement forces the clamping shoe 239 in a forward direction (to the left in FIG. 15) and up against the inner edge of the track member 184. This movement of the wedge member 238 also forces the second clamping shoe 240 to move in a rearward direction (to the right in FIG. 15) and up against the inner edge of the rear track member 185. This locks the support carriage 186 to the track members 184 and 185 and thus prevents any lateral movement of the support carriage 186 along such track members 184 and 185.

When the hydraulic ram mechanism 244 is deenergized the clamping shoes 239 and 240 are returned to their original retracted positions by means of a pair of coil springs 247a and 247b, each of which is connected between the clamping shoe 239 and the clamping shoe 240.

The clutch mechanism 236 of FIG. 15 is shown in an enlarged cross-sectional manner in FIG. 17. As seen in FIGS. 15 and 17, this clutch mechanism 236 includes an internally threaded sleeve member 248 which is threaded onto the lead screw 190. As indicated in FIG. 17, a flexible metal strap or band 249 passes over the sleeve member 248 and the two free ends of such flexible band 249 are bolted to a block member 250. Located intermediate the block member 250 and the sleeve member 248 are a hydraulic ram mechanism 251 and a brake block 252. The hydraulic mechanism 251 includes a piston member 253 which is urged against the inner surface of the block member 250 when the ram mechanism 251 is energized. At the same time, the rear part of the ram mechanism housing is urged against the brake block 252. Thus, energizing of the ram mechanism 251 serves to engage the clutch mechanism. In other words, activation of the ram mechanism 251 forces the brake block 252 against the sleeve member 248, thus preventing further rotation thereof. This, in turn, causes the sleeve member 248 and hence the support carriage 186 to advance its position along the lead screw 190 when such lead screw 190 is being rotated. When the ram mechanism 251 is deenergized, then the sleeve member 248 is free to turn or rotate with the lead screw 190. When this occurs, the sleeve member 248 merely sits and idles in the same lateral position along the lead screw 190.

The second clutch mechanism 237 is constructed in the same manner as the first clutch mechanism 236. The second clutch mechanism 237 is located adjacent to the other side of the support carriage 186. A spacer member 254 in the form of an unthreaded sleeve is located between the sleeve member 248 of the first clutch mechanism 236 and the corresponding sleeve member of the second clutch mechanism 237. The spacer member 254 maintains the desired spacing between the two sleeve members. The ram mechanisms associated with the clutch mechanisms 236 and 237 are preferably driven by a common power source so that the engaging and disengaging of the two clutch mechanisms will occur at the same time. Clutch mechanisms 236 and 237 are of a free-floating nature in the sense that they are not fastened to the support carriage 186. They are, however, prevented from rotating about the lead screw 190 by means of a top plate 254a (FIG. 13), which is fastened between the two upwardly extending side portions of the support carriage 186, and a strip of shim material 254b (FIG. 13) which is fastened to the underside of the plate 254a.

Referring now to FIGS. 18 and 19, there is shown in greater detail the manner of construction of the short guide roller subassembly 191. FIG. 18 is a cross-sectional view taken along section line 18—18 of FIG. 13, while FIG. 19 is a cross-sectional view taken along section line 19—19 of FIG. 18. As seen in both figures, the guide roller subassembly 191 includes a top plate 255 which is secured to the under side of the support carriage 186 (FIG. 13). As seen in FIG. 19, the subassembly 191 further includes a front plate 256 and a back plate 257 each of which is bolted to the top plate 255. As is generally indicated in FIG. 18, each of these front and back plates 256 and 257 is provided with a T-shaped opening, these openings providing a T-shaped passageway 258 through the subassembly 191 in a front to back direction. In operation, the structural shapes being handled pass through this T-shaped passageway 258. As indicated in FIG. 18, a side plate 259 is fastened to the right side (looking downstream) of the subassembly 191. A spacer member 260 mounted on the shaft of a bolt 261 serves to maintain the spacing between the front and back plates 256 and 257 at the lower left-hand corner of such plates.

As indicated in FIG. 18, there is located inside of the subassembly 191 a first guide roller 262 which is rotatably mounted on a slidable subassembly 263. The roller 262 is made of a metal material such as, for example, steel. The slidable subassembly 263 includes a top plate 264, an intermediate block member 265 and a bottom plate 266 which, as indicated in FIG. 19, are bolted together to form a single unit. The intermediate block member 265 includes along the front and back sides thereof key slots 267 and 268 (FIG. 19) which ride on corresponding keys 269 and 270 which are secured to the inner walls of the front panel 256 and the back panel 257, respectively. As is seen in FIG. 18, the right end of the slidable subassembly 263 is positioned adjacent to a piston 271 of a hydraulic ram mechanism 272. Actuation of the ram mechanism 272 causes the slidable subassembly 263 and hence the guide roller 262 to move towards the left (looking downstream). During such movement, the subassembly 263 slides on the keys 269 and 270.

As is shown in FIG. 18, the keyed control shaft 193 passes through a cylindrical sleeve member 274 which is rotatably mounted in a support block 275. The sleeve member 274 includes an externally threaded portion 276 on the left side thereof and an enlarged head or flange portion 277 at the right end thereof. The support block 275 is bolted to the right side plate 259 and the top plate 255 of the subassembly 191. The flange portion 277 of the sleeve member 274 is rotatably mounted in a recessed portion of the support block 275 by means of circular bearing plates 278 and 279 and sets of circular shims 280 and 281. A key member 282 is bolted into a suitable internal recess at the right-hand end of the sleeve member 274. This key member 282 extends inwardly and rides in a key slot 193a of the control shaft 193. As a consequence, rotation of the control shaft 193 produces rotation of the sleeve member 274.

Mounted on the threaded portion 276 of the sleeve member 274 is a roller support mechanism 284. This roller support mechanism 284 includes a support block 285 having a cylindrical passageway 286 through which extends the keyed control shaft 193. The clearance is sufficient to allow rotation of the shaft 193. An internally threaded nut member 287 is threaded onto the threaded portion 276 of the sleeve member 274, this nut member 287 being attached to the support block 285. Bolted to the lower part of the support block 285 is a roller mounting subassembly 288. This subassembly 288 includes a top plate 289, a bottom plate 290 and an intermediate block member 291, the three of which are bolted together to form a single unit. A second guide roller 292 is rotatably mounted on a shaft 293 which is supported in suitable apertures in the top and bottom plates 289 and 290. The roller 292 is made of a metal material such as, for example, steel. It is rotatably mounted on the shaft 293 by means of roller bearing assemblies 294 and 295. (The internal construction and mounting of the first guide roller 262 are the same as that for this second guide roller 292.)

The lower portion of the support block 285 and the adjoining portion of the intermediate block member 291 are provided with horizontally extending key slots on the front and back sides thereof. These key slots cooperate with inwardly protruding keys which are mounted on the inner surfaces of the front and back panels 256 and 257. This slot and key arrangement is similar to that previously discussed for the slidable roller mounting subassembly 263 associated with the right-hand guide roller 262. It provides support for the lower portion of the support block 285 and the roller mounting subassembly 288, while still permitting horizontal movement (from left to right or vice versa) of these elements.

This manner of construction permits the second guide roller 292 to be moved either to the right or to the left for purposes of accommodating structural shapes having vertical members of different thickness. This guide roller movement or adjustment is provided by rotating the keyed control shaft 193. This, in turn, rotates the sleeve member 274. This causes the threaded nut member 287 and hence the support block 285 to move either to the right or to the left, depending on the direction of rotation of the control shaft 193. This adjustment is made in accordance with the size of the gap desired between the two guide rollers 262 and 292. The sliding movement of the first guide roller 262, on the other hand, is for purposes of causing firm engagement between the guide rollers 262 and 292 and the two sides of the vertical portion of the structural shape, this first guide roller 262 being driven by the ram mechanism 272 for this purpose.

Returning for a moment to FIG. 13 of the drawings, the second short guide roller subassembly 192 is of the same construction as that just discussed for the first short guide roller subassembly 191. The second subassembly 192 is, of course, provided with a separate keyed control shaft 194 for adjusting the gap between the two guide rollers located within the subassembly 192.

Figure 20:
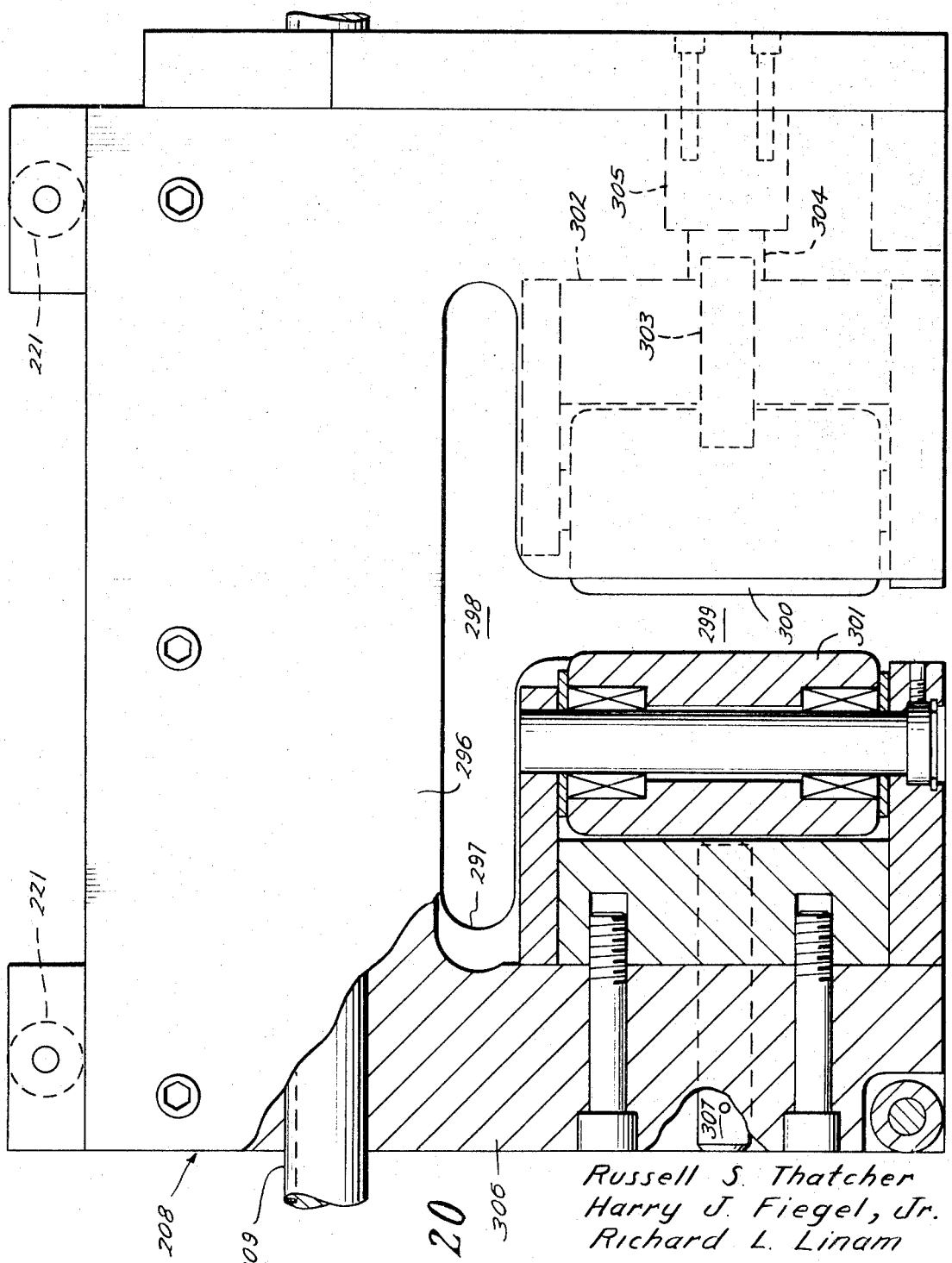
FIG. 20 is a partially cut away front elevational view of a long guide roller subassembly used with each of the shape positioning units, the part shown in a cross-sectional manner corresponding to a cross-sectional view taken along section line 20—20 of FIG. 13.

Referring now to FIG. 20, there is shown a partially cut away front elevational view of the long guide roller subassembly 208. Except for differences in dimensions, this subassembly 208 is of generally the same construction as the short guide roller subassembly 191 considered in connection with FIG. 18. As is indicated in FIG. 20, the long guide roller subassembly 208 includes a front panel 296 and a back panel 297, each of which is provided with a T-shaped passageway. These T-shaped openings are in alignment with one another and thus define a T-shaped passageway from front to back through the subassembly 208. The top of the T-shaped passageway is indicated at 298, while the trunk portion of such passageway is indicated at 299. This trunk portion is open at the bottom.

The subassembly 208 further includes a pair of long guide rollers 300 and 301 which is mounted so as to extend part-way into the trunk portion 299 of the T-shaped passageway. These long guide rollers are constructed of a metal material, such as, for example, steel. They are adapted to guide the two sides of the vertical portion of the structural shape as it passes through the T-shaped passageway.

The right-hand guide roller 300 is rotatably mounted on a slidable unit 302 which rides on a pair of keys, a forward one of which is indicated at 303. The slidable unit 302 is positioned adjacent a piston 304 of a hydraulic ram mechanism 305. Actuation of the ram mechanism 305 urges the guide roller 300 towards the left as viewed in FIG. 20.

The left-hand guide roller 301 is rotatably mounted on a movable unit 306. Movable unit 306 is slidably mounted on a pair of keys, a rear one of which is indicated at 307. These keys are attached to the inner surface of the front and back panels 296 and 297. The movable unit 306 also fits over the keyed control shaft 209 and includes an internally threaded nut member (not shown) which is threaded onto a threaded portion of a cylindrical sleeve member which can be rotated by the control shaft 209. This drive mechanism is of the same construction as that shown in FIG. 18 for the short guide roller subassembly 191. Consequently, a detailed showing of this drive mechanism is not repeated in FIG. 20, it being understood that such mechanism lies behind the front panel 296. For present purposes, it is sufficient to state that rotation of the keyed control shaft 209 causes movement of the movable unit 306 toward either the right or left, depending on the direction of rotation of the control shaft 209. This movement is used to adjust the gap spacing between the long guide rollers 300 and 301 for purposes of accommodating structural shapes whose vertical portions have different thicknesses.

FIGS. 13–20 have treated in considerable detail the manner of construction of the first shape positioning unit 29a. Each of the other shape positioning units 29b–29f is constructed in the same manner as the first shape positioning unit 29a. As such, each of these other shape positioning units 29b–29f includes a pair of short guide roller subassemblies (corresponding to subassemblies 191 and 192 of the first unit 29a) and a retractable long guide roller subassembly (corresponding to subassembly 208 of the first unit 29a). Each of these other units 29b–29f also includes a pair of holddown roller subassemblies (corresponding to subassemblies 195 and 204 of the first unit 29a).

As is indicated in the front elevational view of the machine shown in FIG. 3, the keyed control shaft 193 extends in a lateral direction from one end of the support beam 28 to the other. It passes through the forward short guide roller subassembly of each of the shape positioning units 29a–29f. At the right end of the beam 28, the shaft 193 is supported from the under side of the beam 28 by means of a shaft support mechanism 308. This mechanism 308 is, in turn, driven by a stepping motor 309 which is also supported from the under side of the beam 28. At the left end of the beam 28 (not shown in FIG. 3), the keyed control shaft 193 is supported from the under side of the beam 28 by means of a second shaft support mechanism similar to the mechanism 308, except that no motor is coupled thereto.

In terms of the view of FIG. 3, the keyed control shaft 194 associated with the rearward short guide roller subassemblies lies directly behind the first keyed control shaft 193. This second control shaft 194 likewise extends laterally across the conveyor system 22 from one end of the support beam 28 to the other. As such, it passes through the rearward short guide roller subassembly in each of the shape positioning units 29a–29. At the right-hand end of the beam 28, it is supported by the shaft support mechanism 308 and, at the left-hand end of the beam 28, it is supported by the same shaft support mechanism which supports the first control shaft 193.

Referring now to FIG. 21, there is shown a side elevational view of the shaft support mechanism 308. This view is taken along section line 21—21 of FIG. 3. As seen in FIG. 21, the shaft support mechanism 308 includes a support plate 310 which is suspended between the track members 184 and 185 of the support beam 28. Bolted to the top of the support plate 310 are sets of block members 311 and 312. These block members 311 and 312 are, in turn, fastened to the track members 184 and 185. respectively, by means of sets of bolts 313 and 314, respectively. These bolts 313 and 314 pass through suitable apertures in the track members 184 and 185 and are threaded into the block members 311 and 312. Attached to the bottom of the support plate 310 is a further downwardly extending support plate 315. This support plate 315 includes a pair of side-by-side apertures through which pass the keyed control shafts 193 and 194. Suitable bearing assemblies are provided in each case for permitting ready rotation of the control shafts 193 and 194. Chain sprockets 316 and 317 are attached to the outwardly extending ends of the control shafts 193 and 194, respectively. A standard type of chain tensioning device 318 is bolted to the outer side of the support plate 315. This chain tensioning device 318 has mounted thereon a chain sprocket 319 which is biased in an upwardly direction. A continuous link chain 320 passes over each of the sprockets 316, 317 and 319.

This manner of construction couples the keyed control shafts 193 and 194 to one another so that the gap spacings between the guide rollers in the forward and rear short guide roller subassemblies will always be the same. The rear control shaft 194 is connected to the stepping motor 309 which, as shown in FIG. 3, is mounted on the support beam 28 immediately to the outside of the shaft support mechanism 308. When pulsed, the stepping motor 309 causes rotation of the keyed control shafts 193 and 194 and, hence, causes adjustment of the short guide roller gap spacings.

As previously indicated, the keyed control shaft 209 for the long guide roller subassemblies also extends from one side to the other of the support beam 28 and is driven by stepping motor 220 (FIG. 2) mounted near the right end of the support beam 28. Normally, it will be desirable to have the stepping motor 220 receive its energizing power from the same power source as is driving the stepping motor 309 for the short guide roller control shafts 193 and 194. This provides the same adjustment of the gap for the long guide rollers as is provided for the short guide rollers, though, as will be seen, the gap spacing for the long guide rollers is made slightly greater (e.g., one-sixteenth inch greater) than the gap spacing for the short guide rollers.

The various motors discussed above may be of either the electric or hydraulic type. The various switches and valves for controlling these motors, as well as the valves for controlling the various hydraulic ram mechanisms, are mounted on a master control panel (not shown) which is located adjacent the catwalk 49 (FIG. 1) so as to be readily available to the human operator 48.

OPERATION OF THE PREFERRED EMBODIMENT

Considering now the operation of the panel fitting and welding machine, it is first necessary to make some initial set up adjustments which are dependent on the size and shape of the structural shapes to be handled, the number of and spacing between the shapes, and the size of the structural plate to which the shapes are to be fitted and welded. Initially, it is necessary to decide whether or not the long guide rollers (e.g., 300 and 301 of FIG. 20) are to be used. If the vertical dimension of the structural shapes is relatively small, then they are not used and the long guide roller subassemblies (e.g., subassembly 208 of positioning unit 29a in FIG. 13) in which they are mounted are retracted upwardly so as to be above the top of the structural shapes. This is accomplished by activating the motor 219 (FIG. 2) which causes rotation of the drive shafts 218 of the jack mechanisms 212 (FIG. 13). This raises the secondary support beam 210 and hence the various long guide roller subassemblies of each of the shape positioning units 29a–29.

It is also necessary to adjust the heights of the various working portions of the machine relative to the conveyor system 22. The height of the positioning and holddown apparatus 23 and, hence, the shape positioning units 29a–29f thereof (FIGS. 2 and 3) is adjusted by operating the elevator units 30 and 31 (FIG. 2) which raise and lower the positioning and holddown apparatus support beam 28. The height of the shape positioning units 29a–29f is adjusted so that the upper flanges of the shapes can pass freely through the top parts of the T-shaped passageways of these shape positioning units 29a–29f (see FIG. 3).

The height of the welding units 34a–34f (FIG. 2) is adjusted by operating the elevator units 37 and 38 which raise and lower the welding apparatus support beams 32 and 33. The height is adjusted so that the lower tips of the welding guns 35a, 36a, 35b, 36b, etc., are at the proper height relative to the top surface of the structural plate 26 to be welded. If the shapes to be handled have flange portions which lie against the structural plate 26, then the offset adjustment of the welding guns 35a, 36a, etc., should also be made at this time. This latter adjustment is accomplished for the welding guns 35a and 36a, for example, by pulsing the stepping motors 143 and 144 (FIGS. 4 and 9) to raise the bracket members 122 and 136 (FIG. 9) to which the welding rod feed motors 118 and 133 and, hence, the upper ends of the welding guns 35a and 36a are coupled (see FIG. 9). This arrangement is continued until the lower tips of the welding guns 35a and 36a have moved laterally away from the vertical portion of the shape by a distance corresponding to the width of the flange on each side of the shape. If a shape flange lies against the plate 26 on only the right side of the shape 27a, then such offset adjustment is made only for the right side welding gun 35a and not for the left-side welding gun 36a. The converse applies if the flange lies only on the left side of the shape.

The height of the secondary holddown apparatus 25 is adjusted by operating the elevator units 41 and 42 (FIG. 2) which raise and lower the secondary holddown apparatus support beam 40. The height of the holddown support beam 40 is adjusted until the bottom extremities of the holddown rollers 71 and 72 (FIGS. 4 and 6) are even with the elevation at which the top surfaces of the structural shapes should normally be in the absence of any warping or kickup or the like.

It is also necessary to adjust the lateral spacings between the shape positioning units 29a–29f and the welding unit 34a–34f in accordance with the desired spacings of the structural shapes 27a–27f across the structural plate 26 (FIGS. 2 and 3). This is accomplished by activating the motor (not shown) which rotates the lead screw 190 (FIGS. 4 and 13) which passes through the carriage drive mechanisms of each of the shape positioning units 29a–29f. The carriage drive mechanisms 189 of the first shape positioning unit 29a is shown in FIGS. 13 and 15. With respect to this shape positioning unit 29a, the locking mechanism 235 (FIG. 15) is unlocked by deenergizing the ram mechanism 244. This unlocks the shape positioning unit 29a so that it may move laterally on the track members 184 and 185. With the locking mechanism 235 unlocked, the two clutch mechanisms 236 and 237 are then engaged by activating the ram mechanisms located therein (e.g., ram 251 for clutch 236—FIG. 17). This causes the shape positioning unit 29 a to move laterally either to the right or to the left along track members 184 and 185, depending upon the direction of rotation of the lead screw 190. When the shape positioning unit 29a reaches the desired lateral position, the clutch mechanism 236 and 237 are thereupon disengaged and the locking mechanism 235 is again locked.

This lateral positioning process is then repeated (or simultaneously performed) for each of the other shape positioning units 29b–29f. In some cases, it will be necessary to reverse the direction of rotation of the lead screw 190 for obtaining the desired positioning of a particular unit. After all of the shape positioning units 29a–29f have been properly positioned, the motor which drives the lead screw 190 may be deenergized, if desired.

Note that the lateral positioning of the shape positioning units 29a–29f automatically adjusts the lateral positions of the welding units 34a–34f. This is because each of the welding units 34a–34f is coupled to the rear end of the shape positioning unit located immediately ahead (upstream) of it (see, for example, coupling elements 158–165 in FIG. 8).

One further preliminary adjustment remains to be accomplished, namely, the adjustment of the gap spacing between the various pairs of guide rollers located in each of the shape positioning units 29a–29f. This is accomplished by rotation of the keyed control shafts 193, 194 and 209 (FIG. 13). The short guide roller control shafts 193 and 194 are caused to rotate by energizing the motor stepping 309 (FIG. 3) located near the right end of the support beam 28. The rotation of the control shafts 193 and 194 is allowed to continue until the left-hand guide rollers (e.g., guide roller 292 of FIG. 18) assume the proper lateral positions for the particular thickness of the web of the structural shapes to be handled. These lateral positions should be such that the short guide rollers will firmly engage the vertical sides of the structural shapes when the guide roller ram mechanisms (e.g., ram mechanism 272 of FIG. 18) are energized. Rotation of the keyed control shaft 209 for the long guide rollers is accomplished by pulsing the stepping motor 220 (FIG. 2). For the case of the long guide rollers 300 and 301 of FIG. 20, for example, rotation of the control shaft 209 is allowed to continue until the left-hand roller 301 assumes the proper position for the particular web thickness to be handled. This position is such that when the ram mechanism 305 is energized, the gap spacing between rollers 300 and 301 is slightly greater (e.g., one-sixteenth inch greater) than the thickness of the vertical portion of the structural shape. Thus, the long guide rollers are used to perform a "guiding" function, as opposed to a "firmly engaging" function.

Initially, the ram mechanisms which control the positions of the right-hand ones of the long and short guide rollers and the ram mechanisms coupled to the holddown rollers of the shape positioning units 29a–29f are in a deenergized condition. This facilitates the initial entry of the structural shapes into the shape positioning units 29a–29f.

With the initial adjustments accomplished, the machine is now ready to begin the manufacture of the structural panels.

Considering first the case where the machine is loaded in a manual manner, a structural plate 26 is placed on the conveyor system 22 ahead of the shape positioning and holddown apparatus 23 (FIG. 1). The pusher chains 57 (FIG. 3) associated with the conveyor system 22 are operated until a retractable dog on each of the chains 57 engages the far end of the structural plate 26. The structural plate 26 is then advanced by such pusher chains 57 until the leading edge of the plate 26 is below approximately the rearward ends of the long guide roller subassemblies (e.g., subassembly 208 in FIG. 4). The movement of the pusher chains 57 is then discontinued. The structural shapes 27a–27f are then placed on the plate 26 and guided into the guide roller subassemblies of their respective ones of the shape positioning units 29a–29f. Such shapes are advanced into the shape positioning units until their leading ends are even with the rearward ends of the long guide roller subassemblies. The distance the plate 26 is advanced into the machine relative to the shapes is, of course, determined by the desired spacing of the ends of the shapes from the leading edge of the plate 26.

At this point, the various ram mechanisms associated with the various guide rollers and holddown rollers in the shape positioning units 29a–29f are energized. The short guide roller rams cause the short guide rollers to firmly engage the two sides of the vertical portion of each shape. Sufficient hydraulic pressure is supplied to the holddown roller rams (e.g., 201 and 207 of FIG. 13) to force the structural shapes 27a–27f tightly against the structural plate 26. In the majority of cases, somewhere on the order of 20 percent of the maximum available holddown force should be sufficient ro accomplish this purpose.

The pusher chains 57 are now reactivated to commence a continuous movement of the shapes 27a–27f and plate 26 through the machine. As the leading edges of the shapes 27a–27 reach the welding guns 35a, 36a, 35b, 36b, etc., the welding guns are energized to commence the welding operation. At this time, the welding rod feed motors (e.g., 118 and 133 of FIG. 8) are activated to supply the welding rods to the welding guns. The welding seams produced by the welding guns may extend continuously from one end of each shape to the other or, instead, such seams may be of an intermittent character. If intermitten, the seam portions on the two sides of each shape may either be located in a side-by-side manner or they may be staggered relative to one another. These different seam patterns are obtained by properly controlling the time intervals during which the welding guns 35a, 36a, etc., are turned on. Thus, for intermittent seams, the welding guns 35a, 36a, etc., would be turned on and off in a repetitive manner having the proper time relationship with respect to the rate of movement of the shapes and plate past the welding guns.

As the welded structure emerges from the welding apparatus 24, it passes under the secondary holddown rollers 71 and 72 (FIG. 4). These secondary holddown rollers 71 and 72 have the important function of preventing kickup or warping of the welded structure caused by the heating of the shapes and plate during the welding operation. The secondary holddown rollers 71 and 72 serve to keep the welded structure in the desired alignment until such structure has cooled down sufficiently so as not to kick up or warp.

As the trailing edges of the structural shapes 27a–27f leave the welding area, the welding guns 35a, 36a, etc., are turned off. The ram mechanisms associated with the guide rollers and holddown rollers in the shape positioning units 29a–29f are also deenergized. The machine is then ready to accept the next load of shapes and plate.

The foregoing manner of operation assumes the case of a completely manual loading of the shapes and plates into the machine. If, however, the loading machine of the above-mentioned copending patent application of Messrs. Fiegel, Jr. and Thatcher is used, then the loading operation is considerably simplified and expedited. In such case, the structural shapes are already in their proper positions on the structural plate and the entire load as a unit is simply fed directly into the panel fitting and welding machine. Even without the use of such loading machine, however, the panel fitting and welding machine of the present patent application saves a considerable amount of time and labor in the manufacture of the structural panels.

An advantage of the present panel fitting and welding machine is that not only can it be adjusted to accommodate different sizes, shapes and spacings of structural shapes but, in addition, such adjustments can be accomplished fairly rapidly and with a minimum of effort. If, at some point in the manufacturing process, it is desired to switch to a different size or shape or spacing for the structural shapes, then the human operator merely has to discontinue the manufacturing operation for a short setup period while he makes the necessary adjustments with the switches and valves located on the master control panel. In this regard, various indicating devices and meters can be provided on such master control panel for indicating the heights and spacings of the various elements.

A further advantage of the present panel fitting and welding machine is that it may be readily adapted for operation in an automatic manner. For example, the operation of the pusher chain load advancing mechanism, the operation of the ram mechanisms associated with the guide rollers and holddown rollers and the operation of the welding guns may be controlled by means of automatic control circuits and timing circuits, together with the use of appropriate position sensing devices for signaling the control circuits when the shapes and plates are present at different positions in the machine. As a further step in the automation process, the making of the various adjustments which are required when changing to a different size or shape or spacing for the structural shapes can also be automated. This is accomplished by using a program control unit which is pre-programmed in accordance with the sequences in which the different shape parameters will occur. This latter degree of automation is, of course, most useful where the structural shape parameters are changed with a relatively high frequency.

An additional advantage of the present panel fitting and welding machine is the relative ease with which it may be serviced and maintained. For example, the welding guns 35a, 36a, etc., are readily rendered accessible for service purposes by moving the entire secondary holddown apparatus 25 out of the way by unbolting and sliding such holddown apparatus 25 along the tracks 65, 66, 77 and 78 (FIG. 2). Similarly, the entire welding apparatus 24 can be moved out of the way to enable servicing of the rear portions of the shape positioning units 29a–29 by movement of such apparatus 24 on these same tracks.

In the foregoing description, it was assumed, for sake of example, that the panel fitting and welding machine was constructed to handle a group of six side-by-side structural shapes. The machine, however, can readily accommodate a larger number of structural shapes by mounting additional shape positioning units on the support beam 28 and additional welding units on the support beams 32 and 33. In the reverse sense, a lesser number of shapes can be handled by either decreasing the number of shape positioning units and welding units or, instead, by moving the unneeded units off to one side or the other of the conveyor system 22.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A panel fitting and welding machine comprising:
conveyor means for moving a plurality of structural shapes and a structural plate in a given direction;
positioning and holddown apparatus including a plurality of shape positioning units located in a side-by-side manner laterally across the conveyor means for guiding the shapes in a direction parallel to the direction of movement of the conveyor means and for maintaining a spaced apart relationship between shapes, such shape positioning units including holddown means for holding the shapes tightly against the plate during the welding operation; and welding apparatus located downstream of the positioning and holddown apparatus and including a plurality of welding units located in a side-by-side manner laterally across the conveyor means for welding the structural shapes to the structural plate as they move past the welding apparatus.

2. The invention of claim 1 including secondary holddown apparatus located downstream of the welding apparatus for preventing warping of the shapes and plate during the welding operation.

3. A panel fitting and welding machine in accordance with claim 1 which further includes means for adjusting the lateral spacings between the shape positioning units for providing different spacings between the shapes welded to different plates.

4. A panel fitting and welding machine in accordance with claim 3 wherein the welding units are movable in the lateral direction and wherein the machine further includes a plurality of coupling means for individually coupling the welding units to different ones of the shape positioning units for causing the welding units to follow any changes in lateral spacing of the shape positioning units.

5. A panel fitting and welding machine in accordance with claim 4 wherein each of the coupling means includes a compliant linkage system for enabling the machine to accommodate structural shapes which may have small amounts of longitudinal curvature.

6. A panel fitting and welding machine in accordance with claim 5 wherein each welding unit includes a pair of laterally spaced welding guns coupled to one another by means of a compliant linkage system for receiving therebetween the shape to be welded.

7. A panel fitting and welding machine in accordance with claim 1 wherein each shape positioning unit includes at least one set of guide rollers for engaging opposite sides of a structural shape for maintaining it in a given position on the plate and means for adjusting the gap between the guide rollers for accommodating structural shapes of different dimensions.

8. A panel fitting and welding machine in accordance with claim 7 wherein the positioning and holddown apparatus further includes a keyed control shaft extending through the various shape positioning units and wherein the roller gap adjusting means in each of the shape positioning units includes a movable support member for one of the guide rollers of each set and a keyed lead screw mechanism for receiving the control shaft and moving the support member in response to rotation of such control shaft.

9. A panel fitting and welding machine in accordance with claim 1 wherein the positioning and holddown apparatus further includes means for adjusting the heights of the shape positioning units relative to the conveyor means for accommodating structural shapes of different dimensions.

10. A panel fitting and welding machine in accordance with claim 1 wherein each shape positioning unit includes a set of short guide rollers for engaging and a set of long guide rollers for guiding opposite sides of a structural shape and wherein the positioning and holddown apparatus includes means for retracting the long guide rollers to a disengaged position when the shapes being handled extend to a relatively short height above the conveyor means.

11. A panel fitting and welding machine in accordance with claim 10 wherein the positioning and holddown apparatus further includes means for adjusting the heights of the shape positioning units relative to the conveyor means for accommodating shapes which extend to different heights above the conveyor means.

12. A panel fitting and welding machine in accordance with claim 1 wherein each welding unit includes a pair of welding guns and adjustable support means for adjusting the spacing between the guns to accommodate therebetween structural shapes of different dimensions.

13. A panel fitting and welding machine in accordance with claim 11 wherein the welding apparatus further includes means for adjusting the heights of the welding guns relative to the conveyor means for accommodating structural plates of different thickness.

14. A panel fitting and welding machine in accordance with claim 1 wherein the secondary holddown apparatus includes roller means which extend laterally across the conveyor means.

15. A panel fitting and welding machine in accordance with claim 14 wherein the secondary holddown apparatus includes means for adjusting the height of the roller means thereof relative to the conveyor means for accommodating structural shapes and plates of different dimensions.

16. A panel fitting and welding machine comprising:
a conveyor system for moving successive loads in a given direction, each load including a plurality of structural shapes supported on a structural plate;
first support beam means located above and extending laterally across the conveyor system;
a plurality of laterally movable shape positioning units supported by the first support beam means and extending below such means for guiding the shapes in a direction parallel to the direction of movement of the conveyor system and for maintaining a spaced apart relationship between shapes, such shape positioning units including holddown means for holding the shapes tightly against the plates during the welding operations;
means for adjusting the lateral spacing between the shape positioning units;
first elevator means for adjusting the height of the first support beam means above the conveyor system;
second support beam means located downstream of the first support beam means and located above and extending laterally across the conveyor system;
a plurality of laterally movable welding units supported by the second support beam means and extending below such means for welding the structural shapes to the structural plates;
a plurality of coupling means for individually coupling the welding units to different ones of the shape positioning units for causing the welding units to follow any changes in lateral spacing of the shape positioning units;
second elevator means for adjusting the height of the second support beam means above the conveyor system;
third support beam means located downstream of the second support beam means and located above and extending laterally across the conveyor system;
a secondary holddown roller means supported by the third support beam means and extending below such means for preventing warping of the shapes and plates during the welding operations;
and third elevator means for adjusting the height of the third support beam means above the conveyor system.

* * * * *

UNITED STATES PATENT OFFICE
CERTIFICATE OF CORRECTION

Patent No. __3,650,457__   Dated __March 21, 1972__

Inventor(s) __HARRY J. FIEGEL, JR.__

It is certified that error appears in the above-identified patent and that said Letters Patent are hereby corrected as shown below:

Column 3, line 32, change "29" to --29f--.
Column 11, line 73, change "FIg" to --FIG.--.
Column 16, line 26, change "29" to --29f--.
Column 17, line 31, change "29" to --29f--.
Column 17, line 59, change "arrangement" to --adjustment--.
Column 19, line 36, change "27" to --27f--.
Column 20, line 49, change "29" to --29f--.

Signed and sealed this 18th day of July 1972.

(SEAL)
Attest:

EDWARD M. FLETCHER, JR.
Attesting Officer

ROBERT GOTTSCHALK
Commissioner of Patents